(12) United States Patent
Podgorny et al.

(10) Patent No.: US 11,403,715 B2
(45) Date of Patent: *Aug. 2, 2022

(54) METHOD AND SYSTEM FOR PROVIDING DOMAIN-SPECIFIC AND DYNAMIC TYPE AHEAD SUGGESTIONS FOR SEARCH QUERY TERMS

(71) Applicant: Intuit Inc., Mountain View, CA (US)

(72) Inventors: Igor A. Podgorny, San Diego, CA (US); Benjamin Indyk, San Diego, CA (US); Todd Frey Goodyear, San Diego, CA (US)

(73) Assignee: Intuit Inc., Mountain View, CA (US)

(*) Notice: Subject to any disclaimer, the term of this patent is extended or adjusted under 35 U.S.C. 154(b) by 50 days.

This patent is subject to a terminal disclaimer.

(21) Appl. No.: 16/911,451

(22) Filed: Jun. 25, 2020

(65) Prior Publication Data

US 2020/0327622 A1 Oct. 15, 2020

Related U.S. Application Data

(63) Continuation of application No. 15/296,297, filed on Oct. 18, 2016, now Pat. No. 10,733,677.

(51) Int. Cl.
*G06F 16/9032* (2019.01)
*G06Q 40/00* (2012.01)
(Continued)

(52) U.S. Cl.
CPC ....... *G06Q 40/123* (2013.12); *G06F 16/3322* (2019.01); *G06F 16/90324* (2019.01); *G06N 7/005* (2013.01)

(58) Field of Classification Search
CPC .......... G06F 16/3322; G06F 16/90324; G06N 7/005; G06Q 40/123
(Continued)

(56) References Cited

U.S. PATENT DOCUMENTS 5,471,382 A 11/1995 Tallman et al.
5,519,608 A 5/1996 Kupiec
(Continued)

FOREIGN PATENT DOCUMENTS

AU 2001259223 B2 11/2001
CN 101520802 A 4/2009
(Continued)

OTHER PUBLICATIONS

Negoescu et al., "Modeling Flickr Communities Through Probabilistic Topic-Based Analysis," IEEE Transactions on Multimedia, vol. 12, No. 5, pp. 399-416, Aug. 2010.
(Continued)

*Primary Examiner* — Kuen S Lu
(74) *Attorney, Agent, or Firm* — Paradice and Li LLP

(57) ABSTRACT

Disclosed methods and systems provide domain-specific type ahead suggestions for search query terms with a customer self-service system for a tax return preparation system, according to one embodiment. Type ahead suggestions include suggestions for completing a single search query term and/or suggestions for completing a search query having multiple search query terms. The customer self-service system receives one or more search query terms in a search text box, searches for potential search queries that are likely to complete the one or more search query terms, and provides a selected one of the potential search queries in the search text box as a type ahead suggestion, adjacent to the received one or more search query terms, according to one embodiment. The customer self-service system selects one of the potential search queries based on the received search query terms, the user's profile, and/or the user's tax data, according to one embodiment.

20 Claims, 7 Drawing Sheets

(51) Int. Cl.
  *G06F 16/332* (2019.01)
  *G06N 7/00* (2006.01)
(58) Field of Classification Search
  USPC .......................................................... 707/767
  See application file for complete search history.

(56) References Cited

U.S. PATENT DOCUMENTS

| | | |
|---|---|---|
| 5,701,399 A | 12/1997 | Lee et al. |
| 6,006,218 A | 12/1999 | Breese et al. |
| 6,147,975 A | 11/2000 | Bowman-Amuah |
| 6,256,633 B1 | 7/2001 | Dharap |
| 6,349,307 B1 | 2/2002 | Chen |
| 6,513,036 B2 | 1/2003 | Fruensgaard et al. |
| 6,601,055 B1 | 7/2003 | Roberts |
| 6,708,172 B1 | 3/2004 | Wong et al. |
| 6,853,982 B2 | 2/2005 | Smith et al. |
| 7,013,263 B1 | 3/2006 | Isaka et al. |
| 7,222,078 B2 | 5/2007 | Abelow |
| 7,385,716 B1 | 6/2008 | Skaanning |
| 7,424,510 B2 | 9/2008 | Gross et al. |
| 7,565,312 B1 | 7/2009 | Shaw et al. |
| 7,594,176 B1 | 9/2009 | English |
| 7,603,301 B1 | 10/2009 | Regan |
| 7,610,226 B1 | 10/2009 | Miller |
| 7,620,607 B1 | 11/2009 | Ershov |
| 7,627,504 B2 | 12/2009 | Brady et al. |
| 7,685,144 B1 | 3/2010 | Katragadda |
| 7,739,286 B2 | 6/2010 | Sethy et al. |
| 7,747,601 B2 | 6/2010 | Cooper et al. |
| 7,877,402 B1 | 1/2011 | Weiss et al. |
| 7,890,526 B1 | 2/2011 | Brewer et al. |
| 7,966,282 B2 | 6/2011 | Pinckney et al. |
| 7,974,860 B1 | 7/2011 | Travis |
| 8,010,545 B2 | 8/2011 | Stefik et al. |
| 8,019,753 B2 | 9/2011 | Podgorny et al. |
| 8,185,517 B1 | 5/2012 | Wood et al. |
| 8,200,527 B1 | 6/2012 | Thompson et al. |
| 8,311,792 B1 | 11/2012 | Podgorny et al. |
| 8,311,863 B1 | 11/2012 | Kemp |
| 8,341,167 B1 | 12/2012 | Podgorny et al. |
| 8,478,780 B2 | 7/2013 | Cooper et al. |
| 8,484,228 B2 | 7/2013 | Bhattacharyya et al. |
| 8,645,298 B2 | 2/2014 | Hennig et al. |
| 8,660,849 B2 | 2/2014 | Gruber et al. |
| 8,732,222 B2 | 5/2014 | Horvitz et al. |
| 8,805,734 B2 | 8/2014 | Diana et al. |
| 8,817,968 B1 | 8/2014 | Boutcher et al. |
| 8,850,490 B1 | 9/2014 | Thomas et al. |
| 8,892,539 B2 | 11/2014 | Anand et al. |
| 8,909,568 B1 | 12/2014 | Mann et al. |
| 8,935,192 B1 | 1/2015 | Ventilla et al. |
| 8,943,145 B1 | 1/2015 | Peters et al. |
| 8,972,318 B2 | 3/2015 | Prakash et al. |
| 8,983,977 B2 | 3/2015 | Ishikawa et al. |
| 9,015,031 B2 | 4/2015 | Ferrucci et al. |
| 9,037,578 B2 | 5/2015 | Brust et al. |
| 9,060,062 B1 | 6/2015 | Madahar et al. |
| 9,063,983 B1 | 6/2015 | Lee |
| 9,247,066 B1 | 1/2016 | Stec et al. |
| 9,262,528 B2 | 2/2016 | Cooper et al. |
| 9,336,211 B1 | 5/2016 | Bousquet et al. |
| 9,336,269 B1 | 5/2016 | Smith et al. |
| 9,342,608 B2 | 5/2016 | Cook et al. |
| 9,460,191 B1 | 10/2016 | Gaucher et al. |
| 9,471,883 B2 | 10/2016 | Chatterjee et al. |
| 9,582,757 B1 | 2/2017 | Holmes et al. |
| 9,633,309 B2 | 4/2017 | Giffels et al. |
| 9,767,169 B1 | 9/2017 | Paff et al. |
| 9,779,388 B1 | 10/2017 | Hansen et al. |
| 9,881,102 B2 | 1/2018 | Gordner et al. |
| 9,887,887 B2 | 2/2018 | Hunter et al. |
| 9,892,367 B2 | 2/2018 | Guo et al. |
| 9,910,886 B2 | 3/2018 | Adams, Jr. et al. |
| 10,002,177 B1 | 6/2018 | McClintock et al. |
| 10,083,213 B1 | 9/2018 | Podgorny et al. |
| 10,134,050 B1 | 11/2018 | Hung et al. |
| 10,147,037 B1 | 12/2018 | Podgorny et al. |
| 10,162,734 B1 | 12/2018 | Podgorny et al. |
| 10,210,244 B1 | 2/2019 | Branavan et al. |
| 10,354,182 B2 | 7/2019 | Chang et al. |
| 10,733,677 B2 | 8/2020 | Podgorny et al. |
| 10,748,157 B1 | 8/2020 | Indyk et al. |
| 10,755,294 B1 | 8/2020 | Podgorny et al. |
| 11,093,951 B1 | 8/2021 | Podgorny et al. |
| 2002/0087387 A1 | 7/2002 | Calver et al. |
| 2002/0111888 A1 | 8/2002 | Stanley et al. |
| 2002/0111926 A1 | 8/2002 | Bebie |
| 2002/0123983 A1 | 9/2002 | Riley et al. |
| 2002/0169595 A1 | 11/2002 | Agichtein et al. |
| 2003/0028448 A1 | 2/2003 | Joseph et al. |
| 2003/0061131 A1 | 3/2003 | Parkan |
| 2003/0099924 A1 | 5/2003 | Tsuboi et al. |
| 2003/0101161 A1 | 5/2003 | Ferguson et al. |
| 2003/0115318 A1 | 6/2003 | Wueste |
| 2003/0144873 A1 | 7/2003 | Keshel |
| 2004/0024739 A1 | 2/2004 | Copperman et al. |
| 2004/0034652 A1 | 2/2004 | Hofmann et al. |
| 2004/0064442 A1 | 4/2004 | Popovitch |
| 2005/0114327 A1 | 5/2005 | Kumamoto et al. |
| 2005/0137939 A1 | 6/2005 | Calabria et al. |
| 2005/0222989 A1 | 10/2005 | Haveliwala et al. |
| 2005/0246314 A1 | 11/2005 | Eder |
| 2006/0064322 A1 | 3/2006 | Mascarenhas et al. |
| 2006/0074788 A1 | 4/2006 | Grizack et al. |
| 2006/0085255 A1 | 4/2006 | Hastings et al. |
| 2006/0085750 A1 | 4/2006 | Easton et al. |
| 2006/0253578 A1 | 11/2006 | Dixon et al. |
| 2006/0265232 A1 | 11/2006 | Katariya et al. |
| 2007/0011131 A1 | 1/2007 | Delefevre |
| 2007/0192166 A1 | 8/2007 | Van Luchene |
| 2007/0192168 A1 | 8/2007 | Van Luchene |
| 2007/0192179 A1 | 8/2007 | Van Luchene |
| 2007/0219863 A1 | 9/2007 | Park et al. |
| 2007/0244900 A1 | 10/2007 | Hopkins et al. |
| 2007/0259325 A1 | 11/2007 | Clapper |
| 2007/0291739 A1 | 12/2007 | Sullivan et al. |
| 2007/0294195 A1 | 12/2007 | Curry et al. |
| 2008/0189197 A1 | 8/2008 | Allanson et al. |
| 2008/0201413 A1 | 8/2008 | Sullivan et al. |
| 2008/0208610 A1 | 8/2008 | Thomas et al. |
| 2008/0215541 A1 | 9/2008 | Li et al. |
| 2008/0294637 A1 | 11/2008 | Liu |
| 2009/0012926 A1 | 1/2009 | Ishikawa et al. |
| 2009/0077047 A1 | 3/2009 | Cooper et al. |
| 2009/0106224 A1 | 4/2009 | Roulland et al. |
| 2009/0119575 A1 | 5/2009 | Velusamy |
| 2009/0158143 A1 | 6/2009 | Arav |
| 2009/0162824 A1 | 6/2009 | Heck |
| 2009/0248659 A1 | 10/2009 | McCool et al. |
| 2009/0253112 A1 | 10/2009 | Cao et al. |
| 2009/0259642 A1 | 10/2009 | Cao et al. |
| 2009/0265340 A1 | 10/2009 | Barcklay et al. |
| 2009/0292609 A1 | 11/2009 | Vaidyanathan |
| 2010/0068687 A1 | 3/2010 | Bertelsen |
| 2010/0070554 A1 | 3/2010 | Richardson et al. |
| 2010/0076847 A1 | 3/2010 | Heller |
| 2010/0076998 A1 | 3/2010 | Podgorny et al. |
| 2010/0082649 A1* | 4/2010 | Gutt ..................... G06F 16/951 707/758 |
| 2010/0088262 A1 | 4/2010 | Visel et al. |
| 2010/0125781 A1 | 5/2010 | Gadacz |
| 2010/0017388 A1 | 6/2010 | Glover |
| 2010/0138451 A1 | 6/2010 | Henkin et al. |
| 2010/0185630 A1 | 7/2010 | Cheng et al. |
| 2010/0191686 A1 | 7/2010 | Wang et al. |
| 2010/0203492 A1 | 8/2010 | Nibe et al. |
| 2010/0205180 A1 | 8/2010 | Cooper et al. |
| 2010/0205550 A1 | 8/2010 | Chen et al. |
| 2010/0235361 A1 | 9/2010 | Chandran et al. |
| 2010/0241971 A1 | 9/2010 | Zuber |
| 2010/0318919 A1 | 12/2010 | Murphy et al. |
| 2011/0055699 A1 | 3/2011 | Li et al. |
| 2011/0071997 A1 | 3/2011 | Sullivan et al. |

(56) References Cited

U.S. PATENT DOCUMENTS

| | | |
|---|---|---|
| 2011/0106743 A1* | 5/2011 | Duchon .................. G06F 16/35 706/46 |
| 2011/0106895 A1 | 5/2011 | Ventilla et al. |
| 2011/0125734 A1 | 5/2011 | Duboue et al. |
| 2011/0202472 A1 | 8/2011 | Wan et al. |
| 2011/0231347 A1 | 9/2011 | Xu et al. |
| 2011/0246334 A1 | 10/2011 | Schoenberg et al. |
| 2011/0264569 A1 | 10/2011 | Houseworth et al. |
| 2011/0282892 A1 | 11/2011 | Castellani et al. |
| 2012/0005148 A1 | 1/2012 | Horvitz et al. |
| 2012/0005219 A1 | 1/2012 | Apacible et al. |
| 2012/0022983 A1 | 1/2012 | Hughes et al. |
| 2012/0030079 A1 | 2/2012 | Slater et al. |
| 2012/0036053 A1 | 2/2012 | Miller |
| 2012/0077178 A1 | 3/2012 | Bagchi et al. |
| 2012/0084120 A1 | 4/2012 | Hirsch et al. |
| 2012/0084185 A1* | 4/2012 | Ciaramitaro ......... G06Q 40/123 705/31 |
| 2012/0084293 A1 | 4/2012 | Brown et al. |
| 2012/0095976 A1 | 4/2012 | Hebenthal et al. |
| 2012/0101965 A1 | 4/2012 | Hennig et al. |
| 2012/0130910 A1 | 5/2012 | Al-Alami |
| 2012/0130978 A1 | 5/2012 | Li et al. |
| 2012/0136764 A1 | 5/2012 | Miller et al. |
| 2012/0166438 A1 | 6/2012 | Wu et al. |
| 2012/0219142 A1 | 8/2012 | Gould |
| 2012/0221557 A1 | 8/2012 | Edmonds et al. |
| 2012/0233191 A1 | 9/2012 | Ramanujam |
| 2012/0331052 A1 | 12/2012 | Rathod |
| 2013/0006914 A1* | 1/2013 | Ray .......................... G06N 5/02 706/50 |
| 2013/0019286 A1 | 1/2013 | Barborak et al. |
| 2013/0024290 A1 | 1/2013 | Berg et al. |
| 2013/0054497 A1 | 2/2013 | Garland et al. |
| 2013/0066693 A1 | 3/2013 | Laird-McConnell et al. |
| 2013/0073387 A1 | 3/2013 | Heath |
| 2013/0073390 A1 | 3/2013 | Konig et al. |
| 2013/0103493 A1 | 4/2013 | Gao et al. |
| 2013/0110671 A1 | 5/2013 | Gray |
| 2013/0110823 A1 | 5/2013 | Su et al. |
| 2013/0111323 A1 | 5/2013 | Taghaddos et al. |
| 2013/0117677 A1 | 5/2013 | St. Jacques, Jr. |
| 2013/0124449 A1 | 5/2013 | Pinckney et al. |
| 2013/0159233 A1 | 6/2013 | Mason et al. |
| 2013/0204876 A1 | 8/2013 | Szucs et al. |
| 2013/0224713 A1 | 8/2013 | Ajmera et al. |
| 2013/0268319 A1 | 10/2013 | Palombo |
| 2013/0282363 A1 | 10/2013 | Fan et al. |
| 2013/0285855 A1 | 10/2013 | Dupray et al. |
| 2013/0297545 A1 | 11/2013 | Bierner et al. |
| 2013/0297553 A1 | 11/2013 | Bierner |
| 2013/0297625 A1 | 11/2013 | Bierner et al. |
| 2013/0304730 A1 | 11/2013 | Zhou |
| 2013/0325992 A1 | 12/2013 | McGann et al. |
| 2013/0339870 A1 | 12/2013 | Tandra Sishtla et al. |
| 2014/0006012 A1 | 1/2014 | Zhou et al. |
| 2014/0022328 A1 | 1/2014 | Gechter et al. |
| 2014/0052496 A1 | 2/2014 | Diana et al. |
| 2014/0052606 A1 | 2/2014 | Vasudevan et al. |
| 2014/0052716 A1 | 2/2014 | Chakra et al. |
| 2014/0075004 A1 | 3/2014 | Van Dusen et al. |
| 2014/0088944 A1 | 3/2014 | Natarajan et al. |
| 2014/0114822 A1 | 4/2014 | Sharma et al. |
| 2014/0119531 A1 | 5/2014 | Tuchman et al. |
| 2014/0172883 A1 | 6/2014 | Clark et al. |
| 2014/0181652 A1 | 6/2014 | Stanke et al. |
| 2014/0189829 A1 | 7/2014 | McLachlan et al. |
| 2014/0195613 A1 | 7/2014 | Ogilvie |
| 2014/0201045 A1 | 7/2014 | Pai et al. |
| 2014/0222669 A1 | 8/2014 | Novak et al. |
| 2014/0244528 A1 | 8/2014 | Zhang et al. |
| 2014/0280070 A1 | 9/2014 | George et al. |
| 2014/0297268 A1* | 10/2014 | Govrin .................... G06N 5/04 704/9 |
| 2014/0308648 A1 | 10/2014 | Jain |
| 2014/0316856 A1 | 10/2014 | Williams et al. |
| 2014/0324856 A1 | 10/2014 | Lahiani et al. |
| 2014/0337257 A1 | 11/2014 | Chatterjee et al. |
| 2014/0372980 A1 | 12/2014 | Verma et al. |
| 2015/0006344 A1 | 1/2015 | Saimani et al. |
| 2015/0052087 A1 | 2/2015 | Srinivasan et al. |
| 2015/0058380 A1 | 2/2015 | Polonsky et al. |
| 2015/0088608 A1 | 3/2015 | Cama et al. |
| 2015/0095267 A1 | 4/2015 | Behere et al. |
| 2015/0120718 A1 | 4/2015 | Luo et al. |
| 2015/0127587 A1 | 5/2015 | Pinckney et al. |
| 2015/0139415 A1 | 5/2015 | Skiba et al. |
| 2015/0170049 A1 | 6/2015 | Mann et al. |
| 2015/0213021 A1 | 7/2015 | He et al. |
| 2015/0229531 A1 | 8/2015 | O'Sullivan et al. |
| 2015/0254785 A1 | 9/2015 | Yang et al. |
| 2015/0278241 A1 | 10/2015 | Bates-Haus et al. |
| 2015/0317197 A1 | 11/2015 | Blair |
| 2015/0317449 A1* | 11/2015 | Eder ..................... G16H 20/17 600/595 |
| 2015/0324367 A1 | 11/2015 | Aravamudan et al. |
| 2015/0324805 A1 | 11/2015 | Skiba et al. |
| 2015/0363481 A1 | 12/2015 | Haynes |
| 2015/0371137 A1 | 12/2015 | Giffels et al. |
| 2016/0048772 A1 | 2/2016 | Bruno et al. |
| 2016/0055234 A1 | 2/2016 | Visotski et al. |
| 2016/0062980 A1 | 3/2016 | Boguraev et al. |
| 2016/0078567 A1 | 3/2016 | Goldman et al. |
| 2016/0103833 A1 | 4/2016 | Sanders et al. |
| 2016/0148222 A1 | 5/2016 | Davar et al. |
| 2016/0148321 A1 | 5/2016 | Ciaramitaro et al. |
| 2016/0154856 A1 | 6/2016 | Olof-Ors et al. |
| 2016/0179816 A1 | 6/2016 | Glover |
| 2016/0180470 A1 | 6/2016 | Mascaro et al. |
| 2016/0189029 A1 | 6/2016 | Giffels et al. |
| 2016/0196497 A1 | 7/2016 | Allen et al. |
| 2016/0203523 A1 | 7/2016 | Spasojevic et al. |
| 2016/0217472 A1 | 7/2016 | Podgorny et al. |
| 2016/0247165 A1 | 8/2016 | Ryabchun et al. |
| 2016/0259844 A1 | 9/2016 | Trapeznikov et al. |
| 2016/0283491 A1 | 9/2016 | Lu et al. |
| 2016/0306846 A1 | 10/2016 | Adams, Jr. et al. |
| 2016/0371276 A1 | 12/2016 | Furtado et al. |
| 2017/0011352 A1 | 1/2017 | Jones-McFadden et al. |
| 2017/0017899 A1 | 1/2017 | Maor et al. |
| 2017/0024424 A1 | 1/2017 | Almohizea |
| 2017/0032251 A1 | 2/2017 | Podgorny et al. |
| 2017/0032468 A1 | 2/2017 | Wang et al. |
| 2017/0046623 A1 | 2/2017 | Murdock et al. |
| 2017/0124184 A1 | 5/2017 | Podgorny et al. |
| 2017/0228459 A1 | 8/2017 | Wang et al. |
| 2017/0262529 A1 | 9/2017 | Chim et al. |
| 2017/0262900 A1 | 9/2017 | Ramachandran et al. |
| 2017/0270159 A1 | 9/2017 | Wang et al. |
| 2017/0308613 A1 | 10/2017 | Zhu et al. |
| 2017/0323233 A1 | 11/2017 | Bencke et al. |
| 2018/0032523 A1 | 2/2018 | Singhal et al. |
| 2018/0032607 A1 | 2/2018 | Singhal et al. |
| 2018/0032890 A1 | 2/2018 | Podgorny et al. |
| 2018/0089283 A1 | 3/2018 | Indyk et al. |
| 2018/0108092 A1 | 4/2018 | Goodyear et al. |
| 2018/0113935 A1 | 4/2018 | George et al. |
| 2018/0121550 A1 | 5/2018 | Jeon et al. |
| 2018/0137203 A1 | 5/2018 | Hennekey et al. |
| 2018/0165758 A1 | 6/2018 | Saxena et al. |
| 2018/0174055 A1 | 6/2018 | Tirumale et al. |
| 2018/0287968 A1 | 10/2018 | Koukoumidis et al. |
| 2018/0321951 A1 | 11/2018 | Fitzgerald et al. |
| 2019/0018692 A1 | 1/2019 | Indyk et al. |
| 2019/0018899 A1 | 1/2019 | Podgorny et al. |
| 2019/0065576 A1 | 2/2019 | Peng et al. |
| 2019/0103035 A1 | 4/2019 | Beller et al. |
| 2020/0357009 A1 | 11/2020 | Podgorny et al. |

(56) References Cited

U.S. PATENT DOCUMENTS

FOREIGN PATENT DOCUMENTS

| EP | 2159715 A2 | 3/2010 |
| JP | 2014112316 A | 6/2014 |
| WO | WO2001082202 A2 | 11/2001 |
| WO | WO2011053830 A2 | 5/2011 |

OTHER PUBLICATIONS

Bartolome et al., "Processing Unstructured Voice of Customer Feedback for Improving Content Rankings in Customer Support," U.S. Appl. No. 15/094,653, filed Apr. 8, 2016.

Blei et al., "Latent Dirichlet Allocation," Journal of Machine Learning Research 3, Jan. 2003, pp. 993-1022.

Blei et al., "Probablilistic Topic Models," Communications of the ACM, Apr. 2012, vol. 55, No. 4, pp. 77-84.

Dror et al., "From Query to Question in One Click: Suggesting Synthetic Questions to Searchers," International World Wide Web Conferences Steering Committee, May 13, 2013, pp. 391-401.

Encyclopedia Britannica. "Graphical User interface (GUI)." Sep. 5, 2015. Retrieved from the internet <URL: http://www.britannica.com/technology/graphical-user-interface>.

Fitchett et al., "An Empirical Characterisation of File Retrieval," Oct. 3, 2014, University of Canterbury, Christchurch, New Zealand, Int. J. Human-Computer Studies 74 (2015), pp. 1-13 (Year: 2014).

Get Satisfaction [online], Sprinklr, 2017 [retrieved on Nov. 22, 2017], Retrieved from the Internet: <URL: https://getsatisfaction.com/corp>, 5-pages.

Grant et al., "The Human Face of Crowdsourcing: A Citizen-led Crowdsourcing Case Study," 2013 IEEE International Conference on Big Data, Silicon Valley, CA 2013, pp. 21-24.

Han et al., "Understanding and Supporting Cross-Device Web Search for Exploratory Tasks with Mobile Touch Interactions," Apr. 2015, ACM Transactions on Information System, vol. 33, No. 4, pp. 1-35, (Year: 2015).

Kumar et al., "Personalized Web search Using Browsing History and Domain Knowledge" International Conference on Issues and Challenges in Intelligent Computing Techniques (ICICT). IEEE 2014, pp. 493-497.

Mimno et al., "Sparse Stochastic Inference for Latent Dirichlet Allocation," Proceedings of the 29th International Conference on Machine Learning, Edinburgh, Scotland, UK, 2012, 8-pages.

Podgorny et al., "Content Quality and User Ranking in TurboTax AnswerXchange," Proceedings of the European Conference on Social Media, University of Brighton UK, Jul. 10-11, 2014.

Podgorny et al., "Real-Time Detection and Intervention of Poorly Phrased Questions," CHI EA '15, Proceedings of the 33rd Annual ACM Conference Extended Abstracts on Human Factors in Computing Systems, April 18-23, Seoul, Republic of Korea, pp. 2205-2210.

Steyvers et at, "Proabilistic Author—Topic Models for Information Discovery," KDD'04, Aug. 22-25, 2004.

The Scientific Marketer, "Uplift Modelling FAQ," article date of Sep. 27, 2007, retneved from http://scientiftcmarketer.com/2007/09/uplift-modelling-faq.html (Year: 2007), 2-pages.

Wen et al., "Clustering user Queries of a Search Engine," Proceedings of the 10th International Conference on World Wide Web, pp. 162-168, ACM, 2001 (Year: 2001).

Wikipedia, "Widget (GUI)," Sep. 7, 2016. Retrieved from the internet <URL: https://en.wikipedia.org/windex.phy?title=Widget_(GUI)&oldid=738206274>.

Zadeh, "Probabilistic Modeling in Communite-Based Question Answering Services," Dalhousie University, Halifax, Nova Soctia; Feb. 2012, 74-pages.

Garg et al., "Mining Top Issues from Contact Center Logs for Self Help Portals," 2008 IEEE International Conference on Services Computing, pp. 171-178, Jul. 2008.

McGee, Google Instant Search: The Complete User's Guide, Sep. 8, 2010, <URL: https://searchengineland.com/google-instant-complete-users-guide-50136>, retrieved Jul. 19, 2021, 11-pages.

Zolaktaf Zadeh, "Probabilistic Modeling in Community-Based Question Answering Services," Dalhousie University, Halifax, NS, Canada, pp. 1-62, Feb. 29, 2012, retrived from internet on Dec. 17, 2020 at https://dalspace.library.dal.ca/handle/10222/14584.

\* cited by examiner

METHOD AND SYSTEM FOR PROVIDING DOMAIN-SPECIFIC AND DYNAMIC TYPE AHEAD SUGGESTIONS FOR SEARCH QUERY TERMS

CROSS-REFERENCE TO RELATED APPLICATIONS

Patent Application is a continuation of, and claims priority to, U.S. patent application Ser. No. 15/296,297 entitled "METHOD AND SYSTEM FOR PROVIDING DOMAIN-SPECIFIC AND DYNAMIC TYPE AHEAD SUGGESTIONS FOR SEARCH QUERY TERMS" and filed on Oct. 18, 2016, which is assigned to the assignee hereof. The disclosures of all prior Applications are considered part of and are incorporated by reference in this Patent Application.

TECHNICAL FIELD

This disclosure relates generally to machine learning, and more specifically to leveraging user data derived model training data obtained from multiple sources.

DESCRIPTION OF THE RELATED TECHNOLOGY

A tax return preparation system can provide benefits that human professionals are hard-pressed to provide, such as not having limited working hours, not being geographically limited, and not being subject to human error or variations in human ability or temperament. A tax return preparation system can also be configured to provide individualized/personalized services to users. To provide such services, a tax return preparation system can be programmed to include and select from tens of thousands of user experience pages to assist users in preparing their tax returns. This incredible number of user experience pages can create a seemingly endless number of questions regarding the content of the user experience pages, regarding tax laws, and/or regarding the users' data within the tax return preparation system. Users who have unanswered questions often feel fear, uncertainty, and/or doubt about what they are doing or about what they are supposed to do, which may be exacerbated when answers are difficult to find or are time consuming. Feelings of fear, uncertainty, and/or doubt are typically inconsistent with satisfied/happy customers, and such feelings may cause customers to seek alternative measures to prepare their tax returns. Because tax return preparation systems are incredibly capable of saving users time and money, and are convenient tools for completing a potentially tedious task, helping users find answers to their questions is beneficial for both the users and the service provider of the tax return preparation system.

Thus, some of the long standing technical problems that exist in many computing fields and in the field of tax return preparation systems include a deficiency in systems with assisting users in finding answers to questions that the users have.

SUMMARY

The systems, methods and devices of this disclosure each have several innovative aspects, no single one of which is solely responsible for the desirable attributes disclosed herein.

One innovative aspect of the subject matter described in this disclosure can be implemented as a method for providing domain-specific and dynamic type-ahead suggestions for search query terms. The method can be performed by one or more processors of a computing system associated with a customer self-service system, and can include storing a plurality of potential search queries in a memory associated with the computing system, each of the plurality of potential search queries including one or more search terms; presenting user experience data and a search text box on a display screen viewable by a user; receiving, via the search text box presented on the display screen, one or more search query terms of a search query provided by the user; identifying a number of topics in each of the one or more search query terms provided by the user; determining one or more topic relevance scores for each of the potential search queries using a predictive topic model, each topic relevance score indicating a relevance of the corresponding potential search query to a respective one of the topics identified in the received search query terms; ranking the plurality of potential search queries based on their respective topic relevance scores; identifying which potential search query of the plurality of potential search queries has a highest topic relevance score; and presenting the identified potential search query as a type-ahead suggestion on the display screen adjacent to the one or more search query terms provided in the search text box, the presented type-ahead suggestion configured to assist the user by completing the search query. In some implementations, the method can also include receiving one or more additional search query terms from the user via the search text box; and dynamically updating the type-ahead suggestion presented on the display screen based on the one or more additional search query terms.

The predictive topic model can include one or more of a Latent Dirichlet Allocation algorithm, a Latent Semantic Indexing ("LSI") algorithm, a query clustering algorithm, or a query de-duplication algorithm. In some instances, the predictive topic model can be configured to identify the topics in each of the one or more search query terms based at least in part on a number of topics associated with each of the plurality of potential search queries.

In some implementations, the method can also include training the predictive topic model using one of logistical regression, a decision tree, an artificial neural network, a support vector machine, a naive Bayes operation, a linear discriminant analysis, or a k-nearest neighbor algorithm. In other implementations, the method can also include storing a user profile for each of a plurality of users associated with the customer self-service system; determining a level of relevance of each of the plurality of potential search queries to each user profile; and determining, for each of the plurality of potential search queries, a probability score for each user profile based on the determined relevance levels. The user profile can include one or more of a search history of a respective user, an income of the respective user, a zip code of the respective user, or tax exemptions of the respective user. In some instances, determination of the topic relevance scores can be further based on the probability scores determined for the user's profile.

In some other implementations, the customer self-service system can be associated with an electronic tax return preparation system, and the method can also include determining a type of question associated with the one or more search query terms received from the user. In some instances, the determined type of question may be a tax related question or a product-related question.

Another innovative aspect of the subject matter described in this disclosure can be implemented by a computing system configured to provide domain-specific and dynamic type-ahead suggestions for search query terms. The computing system can include one or more processors coupled to a memory. The memory can store instructions that, when executed by the one or more processors, causes the computing system to perform a number of operations. In some implementations, the number of operations includes storing a plurality of potential search queries in a memory associated with the computing system, each of the plurality of potential search queries including one or more search terms; presenting user experience data and a search text box on a display screen viewable by a user; receiving, via the search text box presented on the display screen, one or more search query terms of a search query provided by the user; identifying a number of topics in each of the one or more search query terms provided by the user; determining one or more topic relevance scores for each of the potential search queries using a predictive topic model, each topic relevance score indicating a relevance of the corresponding potential search query to a respective one of the topics identified in the received search query terms; ranking the plurality of potential search queries based on their respective topic relevance scores; identifying which potential search query of the plurality of potential search queries has a highest topic relevance score; and presenting the identified potential search query as a type-ahead suggestion on the display screen adjacent to the one or more search query terms provided in the search text box, the presented type-ahead suggestion configured to assist the user by completing the search query. In some implementations, the number of operations can also include receiving one or more additional search query terms from the user via the search text box; and dynamically updating the type-ahead suggestion presented on the display screen based on the one or more additional search query terms.

The predictive topic model can include one or more of a Latent Dirichlet Allocation algorithm, a Latent Semantic Indexing ("LSI") algorithm, a query clustering algorithm, or a query de-duplication algorithm. In some instances, the predictive topic model can be configured to identify the topics in each of the one or more search query terms based at least in part on a number of topics associated with each of the plurality of potential search queries.

In some implementations, the number of operations can also include training the predictive topic model using one of logistical regression, a decision tree, an artificial neural network, a support vector machine, a naive Bayes operation, a linear discriminant analysis, or a k-nearest neighbor algorithm. In other implementations, the number of operations can also include storing a user profile for each of a plurality of users associated with the customer self-service system; determining a level of relevance of each of the plurality of potential search queries to each user profile; and determining, for each of the plurality of potential search queries, a probability score for each user profile based on the determined relevance levels. The user profile can include one or more of a search history of a respective user, an income of the respective user, a zip code of the respective user, or tax exemptions of the respective user. In some instances, determination of the topic relevance scores can be further based on the probability scores determined for the user's profile.

In some other implementations, the customer self-service system can be associated with an electronic tax return preparation system, and the number of operations can also include determining a type of question associated with the one or more search query terms received from the user. In some instances, the determined type of question may be a tax related question or a product-related question.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
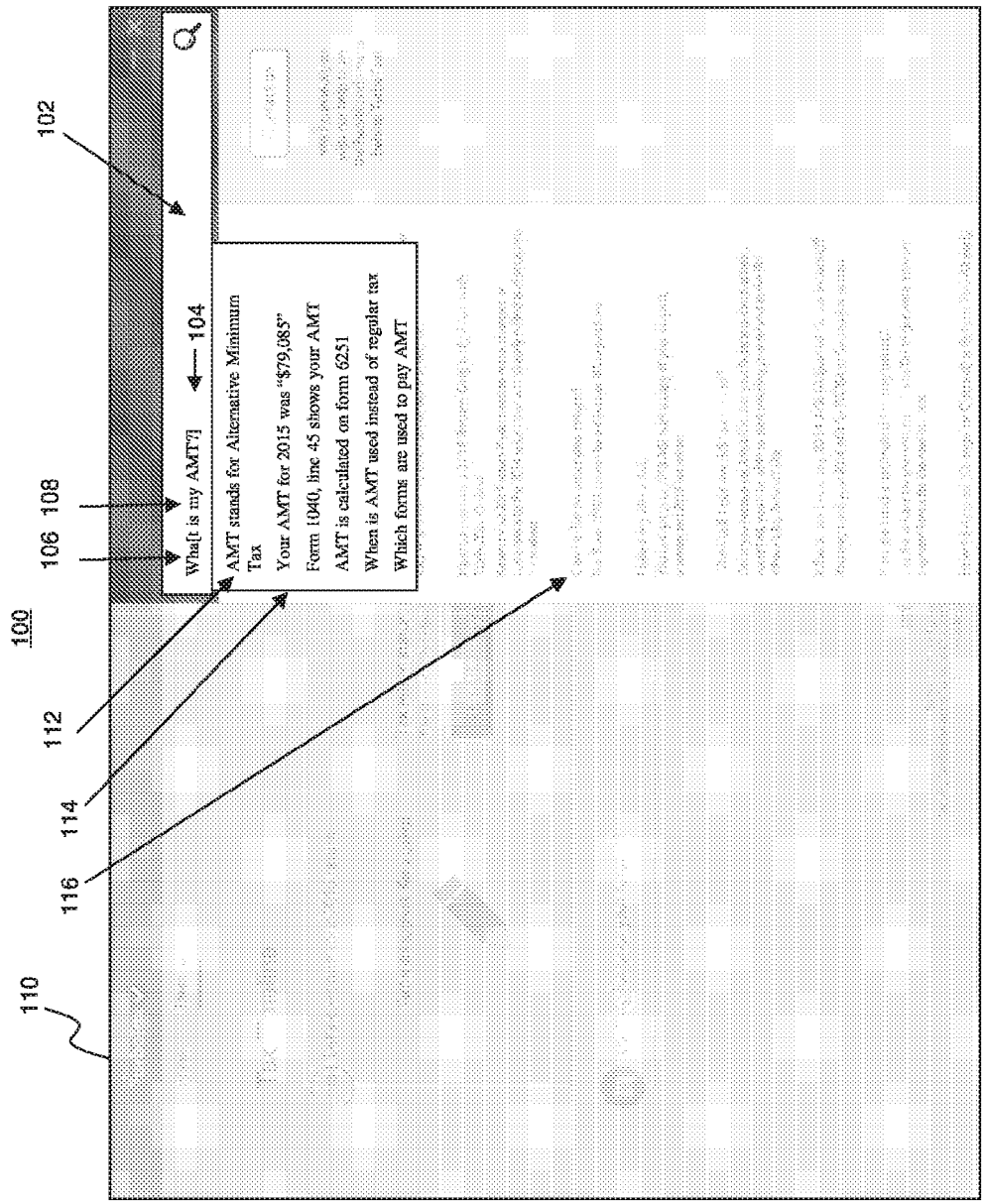
FIG. 1 is a diagram of a user experience page for providing domain-specific and dynamic type ahead suggestions for search query terms with a customer self-service system for a tax return preparation system, in accordance with one embodiment.

Embodiments will now be discussed with reference to the accompanying FIGS., which depict one or more exemplary embodiments. Embodiments may be implemented in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

The INTRODUCTORY SYSTEM, USER EXPERIENCE, ARCHITECTURE, and PROCESS sections herein describe systems and processes suitable for providing domain-specific and dynamic type ahead suggestions for search query terms with a customer self-service system for a tax return preparation system, according to various embodiments.

Introductory System

Preparing tax returns can feel like a generally unpleasant process. Gathering paperwork, spending time preparing the tax return, and trying to understand the jargon that is specific to tax preparation can hardly be avoided while preparing one's tax return. When questions arise for people preparing their tax returns, feelings of fear, uncertainty, and/or doubt are common—especially when people consider the potential negative financial consequences associated with making an error in a tax return. The feelings fear, uncertainty, and/or doubt can be amplified and/or converted into frustration, when people are unable to reasonably/quickly find answers to questions that come up. Embodiments of the present disclosure predict/determine users' likely questions based on partial search queries, user profile data, and/or user tax data that is available to a customer self-service system from the tax return preparation system, according to one embodiment. As customer self-service system determines a user's likely question, the customer self-service system provides a type ahead suggestion (e.g., suggests a completion for a term and/or for the remainder of the search query), according to one embodiment. The type ahead suggestions help users formulate their questions, help users enter a search query faster, personalizes the search query by basing the type ahead suggestions on the users' profile data and/or tax data, and decreases the likelihood that a user will abandon the tax return preparation system out of frustration from not being able to articulate the user's question, according to one embodiment.

Embodiments of the present disclosure include the technical solution of a method and system for providing domain-specific and dynamic type ahead suggestions for search query terms with a customer self-service system for a tax return preparation system. Type ahead suggestions include suggestions for completing a single search query term and/or suggestions for completing a search query having multiple search query terms. Suggestions for completing a single search query term (e.g., a word) are referred herein to as autocomplete, and suggestions for completing a search query are referred to herein as autosuggest. The customer self-service system uses search query terms (or partial search query terms) in combination with user profile data (e.g., navigation or search history) and/or user tax data (e.g., income, zip code, tax exemptions) to determine and suggest search query term and/or a search query that the user is likely to intend to enter or that the user is likely to enter, according to one embodiment.

The customer self-service system uses natural language processing to identify the search query term and/or the search query to suggest (e.g., display) to the user, according to one embodiment. The customer self-service system analyzes search query terms to determine topics that are associated with the search query terms, according to one embodiment. Based on the topics, the customer self-service determines an intent of the search query of the user, according to one embodiment.

Example intents of the search query of the user include, but are not limited to, asking a tax-related question, asking a product-related question, defining terms, searching for user tax data within the tax return preparation system, performing an action within the tax return preparation system, navigating within the tax return preparation system, according to one embodiment. Based on the topics of the search query terms and based on the intent of the search query, the customer self-service system determines or predicts type ahead suggests for a search query term and/or for a search query for a user of a tax return preparation system, according to one embodiment.

The customer self-service system uses a probabilistic topic model to perform natural language processing of the search query terms, according to one embodiment. The probabilistic topic model is implemented using a Latent Dirichlet Allocation ("LDA") algorithm, according to one embodiment.

The customer self-service system uses predictive models to identify a search query term and/or a search query for a type ahead suggestion, according to one embodiment. The customer self-service system applies the received search query term(s), user profile data (e.g., history of visiting interview screen or page, and/or other navigation history with the tax return preparation system), and/or user tax data (e.g., tax or personal information) to a predictive model to identify a search query term and/or a search query for a type ahead suggestion, according to one embodiment.

Because of the inputs applied to the predictive model, the identified type ahead suggestions are based on the context of the user's experience with and/or use of the tax return preparation system and/or the customer self-service system, according to one embodiment.

The customer self-service system disambiguates potentially ambiguous search query terms and/or search queries by using the topic(s) of the search query terms and/or search queries to provide context to an interpretation of the search query terms and/or search queries, according to one embodiment.

The customer self-service system disambiguates potentially ambiguous search query terms and/or search queries by using user profile data and/or user tax data to provide context to an interpretation of the search query terms and/or search queries, according to one embodiment.

As used herein, the term system (e.g., customer self-service system, tax return preparation system, or other software system) includes, but is not limited to the following: computing system implemented, and/or online, and/or web-based, personal and/or business tax preparation systems; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of systems include, but are not limited to the following: TurboTax® available from Intuit, Inc. of Mountain View, Calif.; TurboTax® Online™ available from Intuit, Inc. of Mountain View, Calif.; QuickBooks®, available from Intuit, Inc. of Mountain View, Calif.; QuickBooks® Online™ available from Intuit, Inc. of Mountain View, Calif.; Mint®, available from Intuit, Inc. of Mountain View, Calif.; Mint® Online, available from Intuit, Inc. of Mountain View, Calif.; and/or various other systems discussed herein, and/or known to those of skill in the art at the time of filing, and/or as developed after the time of filing.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system", "computing entity", and/or "computing environment" can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the term "production environment" includes the various components, or assets, used to deploy, implement, access, and use, a given system as that system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement at least part of a system in the production environment such as a data center, a cloud computing environment, a dedicated hosting environment, and/or one or more other computing environments in which one or more assets used by the application in the production environment are implemented; one or more computing systems or computing entities used to implement at least part of a system in the production environment; one or more virtual assets used to implement at least part of a system in the production environment; one or more supervisory or control systems, such as hypervisors, or other monitoring and management systems used to monitor and control assets and/or components of the production environment; one or more communications channels for sending and receiving data used to implement at least part of a system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of a system in the production environment; one or more databases used to store data in the production environment; one or more internal or external services used to implement at least part of a system in the production environment; one or more backend systems, such as backend servers or other hardware used to process data and implement at least part of a system in the production environment; one or more modules/functions used to implement at least part of a system in the production environment; and/or any other assets/components making up an actual production environment in which at least part of a system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the system.

In various embodiments, one or more cloud computing environments are used to create, and/or deploy, and/or operate at least part of the system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given system or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets within one or more cloud or traditional computing environments.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user experience display" includes not only data entry and question submission user interfaces, but also other user experience features and elements provided or displayed to the user such as, but not limited to, the following: data entry fields, question quality indicators, images, backgrounds, avatars, highlighting mechanisms, icons, buttons, controls, menus and any other features that individually, or in combination, create a user experience, as discussed herein, and/or as known in the art at the time of filing, and/or as developed after the time of filing.

As used herein, the terms "user experience page" and "user experience screen" are interchangeable in meaning and represent a changeable rendering or view of content that is provided to a user in the user experience display, according to one embodiment.

As used herein, the term "user experience" includes, but is not limited to, one or more of a search query creation process, an incremental search results receipt process, a user session, interview process, interview process questioning, and/or interview process questioning sequence, and/or other user experience features provided or displayed to the user such as, but not limited to, interfaces, images, assistance resources, backgrounds, avatars, highlighting mechanisms, icons, and any other features that individually, or in combination, create a user experience, as discussed herein, and/or as known in the art at the time of filing, and/or as developed after the time of filing.

As used herein, the term "party," "user," "user consumer," and "customer" are used interchangeably to denote any party and/or entity that interfaces with, and/or to whom information is provided by, the disclosed methods and systems described herein, and/or a legal guardian of person and/or entity that interfaces with, and/or to whom information is provided by, the disclosed methods and systems described herein, and/or an authorized agent of any party and/or person and/or entity that interfaces with, and/or to whom information is provided by, the disclosed methods and systems described herein. For instance, in various embodiments, a user can be, but is not limited to, a person, a commercial entity, an application, a service, and/or a computing system.

As used herein, the term "predictive model" is used interchangeably with "analytics model" to denote one or more individual or combined algorithms or sets of equations that describe, determine, and/or predict characteristics of or the performance of a datum, a data set, multiple data sets, a computing system, and/or multiple computing systems. Analytics models or analytical models represent collections of measured and/or calculated behaviors of attributes, elements, or characteristics of data and/or computing systems.

As used herein, the terms "interview" and "interview process" include, but are not limited to, an electronic, software-based, and/or automated delivery of multiple questions to a user and an electronic, software-based, and/or automated receipt of responses from the user to the questions, to progress a user through one or more groups or topics of questions, according to various embodiments.

As used herein the term "self-service system" is interchangeable with "self-help system", and "self-support system". A self-service system (e.g., a customer self-service system) is a system that enables customers and other users to help themselves find answers to questions, find specific content within the tax return preparation system, navigate within the tax return preparation system, and/or perform one or more actions (e.g., adjust the user tax data within a particular form), according to one embodiment.

As used herein, the terms "type ahead" and "type ahead suggestion" include suggestions for completing a single search query term and/or suggestions for completing a search query having multiple search query terms, according to one embodiment. Suggestions for completing a single search query term (e.g., a word) are referred to herein as autocomplete, and suggestions for completing a search query are referred to herein as autosuggest. A type ahead suggestion is amended to one or more complete or partial search query terms that have already been entered (e.g., into a search text box) by a user. The type ahead suggestions are specific to the domain of a tax return preparation system and may include dynamically modified displayed suggestions for additional search query terms that are specific to searching the tax return preparation system, according to one embodiment. Because the type ahead suggestions are specific to the domain of the tax return preparation system, as used herein, "type ahead suggestions" can be used interchangeably with "domain-specific type ahead suggestions", according to one embodiment. A described below, one or more types of data and one or more models may be used to determine the type ahead suggestion within the domain of a tax return preparation system, according to one embodiment.

As used herein, the term "incremental search results" includes search results that are generated for search query terms based on the various information a tax return preparation system has for a user, as a user enters the search query terms (e.g., in real-time) as part of a search query to a customer self-service system, according to one embodiment. Incremental search results include progressively searched for and filtered through text. As the user types, one or more possible matches for the text are found and immediately presented to the user, according to one embodiment. The incremental search results are specific to the domain of a tax return preparation system and may include automated suggestions for additional search query terms that are specific to searching the tax return preparation system, according to one embodiment. Because the incremental search results are specific to the domain of the tax return preparation system, as used herein, "incremental search results" is used interchangeably with "domain-specific incremental search results". The incremental search results are search results for a partial or complete search query that is based on the received search query terms and based on user tax data (e.g., user profile data), according to one embodiment. The incremental search results are search results for one or more potential search queries that a user could formulate from search query terms that have been received by the customer self-service system, according to one embodiment.

As used herein, the term "incremental search content" includes one or more incremental search results combined with suggested potential search queries, according to one embodiment. Herein, for simplicity, "incremental search results" may be used to reference "potential search queries" that are based on the received search query terms, according to one embodiment.

As used herein the term "search text box" denotes a text box, data entry box, and/or data field in which a user enters search query terms, according to one embodiment.

As used herein the term "results text box" denotes a text box, data entry box, and/or data field in which the incremental search results are displayed, according to one embodiment. The results text box may be displayed in the form of a drop-down menu that appears below (or otherwise proximate to) a search text box, according to one embodiment.

User Experience

FIG. 1 is an example of a user experience page that can be used by a customer self-service system for providing domain-specific and dynamic type ahead suggestions for search query terms with a customer self-service system for a tax return preparation system, according to one embodiment. The type ahead suggestions are domain-specific because the customer self-service system uses information (e.g., user profile data and user tax data) from the domain of the tax return preparation system to determine which type ahead suggestions to provide to the user, according to one embodiment. The type ahead suggestions are dynamic because the customer self-service system dynamically (e.g., in real-time) reevaluates the provided type aheadsuggestions, as additional information (e.g., more or different search query terms) is/are received from the user, or about the user, by the customer self-service system, according to one embodiment. The disclosed type ahead suggestions reduce the time and difficultly associated with entering, defining, and articulating a question that may arise through the use of a tax return preparation system, according to one embodiment. The user experience display 100 includes a search text box 102 that is used to receive data representative search query terms 104 from a user, according to one embodiment. The search text box 102 can be provided by a standalone customer self-service system (e.g., TurboTax AnswerXchange® of Intuit, Inc. of Mountain View, Calif.), according to one embodiment. The search text box 102 is integrated into part of a user experience page 110 of a tax return preparation system (e.g., TurboTax® of Intuit, Inc. of Mountain View, Calif.), according to one embodiment.

The search query terms 104 include one or more search query terms 106 that are received from a user, and the search query terms 104 include a type ahead suggestion 108 (demarcated by brackets in FIG. 1 for convenience of illustration and explanation), according to one embodiment. While the user enters the one or more (whole or partial) search query terms 106, a customer self-service system analyzes the one or more search query terms 106, the user profile data (e.g. history of visiting interview screen or page, other navigation history, search history, etc.) for the user, and/or the user tax data (e.g., income, deductions, assets, zip code, etc.) for the user, according to one embodiment. As a result of the analysis, the customer self-service system selects one of a number of potential search queries and displays the remainder of the selected potential search query next to the one or more search query terms 106 that are received from the user, according to one embodiment. Displaying the remainder of the selected potential search query includes suggesting a completion of a single term of the search query terms 104, according to one embodiment.

For example, the customer self-service system may suggest appending a "t" to "Wha" to suggest the search query term "What". Displaying the remainder of the selected potential search query additionally includes suggesting the addition of several search query terms to form a search query that is likely to be intended by the user, according to one embodiment. For example, the customer self-service system may provide the type ahead suggestion "is my AMT?" for the search query term "What", in order to type ahead suggest the search query "What is my AMT?". The user selects the received type ahead suggestion by selecting the type ahead suggestion (e.g., with a mouse click, a stylus tap, a finger touch, a voice command, pressing the "Tab" keyboard key, pressing the "Enter" keyboard key, etc.), according to one embodiment. The customer self-service system uses one or more models, such as a probabilistic topic model for performing a natural language search and/or a predictive model for analyzing the likelihood of the user's intent based on the context of the user profile data and/or the user's tax data, according to one embodiment.

The user experience display 100 includes a results text box 114 that is a user experience element in which the customer self-service system displays incremental search content 112 in response to the search query terms 104, the one or more search query terms 106, and/or in response to the selection of the type ahead suggestion 108, according to one embodiment. The results text box 114 is a drop-down menu that is located near, proximate, or adjacent to the search text box 102, according to one embodiment. The search text box 102 is located in an upper region of the user experience display 100, and the results text box 114 is located adjacent to and below the search text box 102, according to one embodiment. The results textbox 114 is overlaid on top of other content that is provided in the user experience page 110, in such a manner that it is apparent that there is additional content at a location on the user experience page 110 that appears to be beneath the results text box 114, according to one embodiment.

The user experience display 100 includes search results 116 that are provided in the body of the user experience page 110, in response to submission of the combination of the one or more search query terms 106 and the type ahead suggestion 108, according to one embodiment. In other words, the user experience display 100 can provide incremental search results within the results text box 114 and/or can provide the search results 116 in another location within the user experience display 110, in response to the search query terms 104, according to one embodiment.

Architecture

Figure 2A:
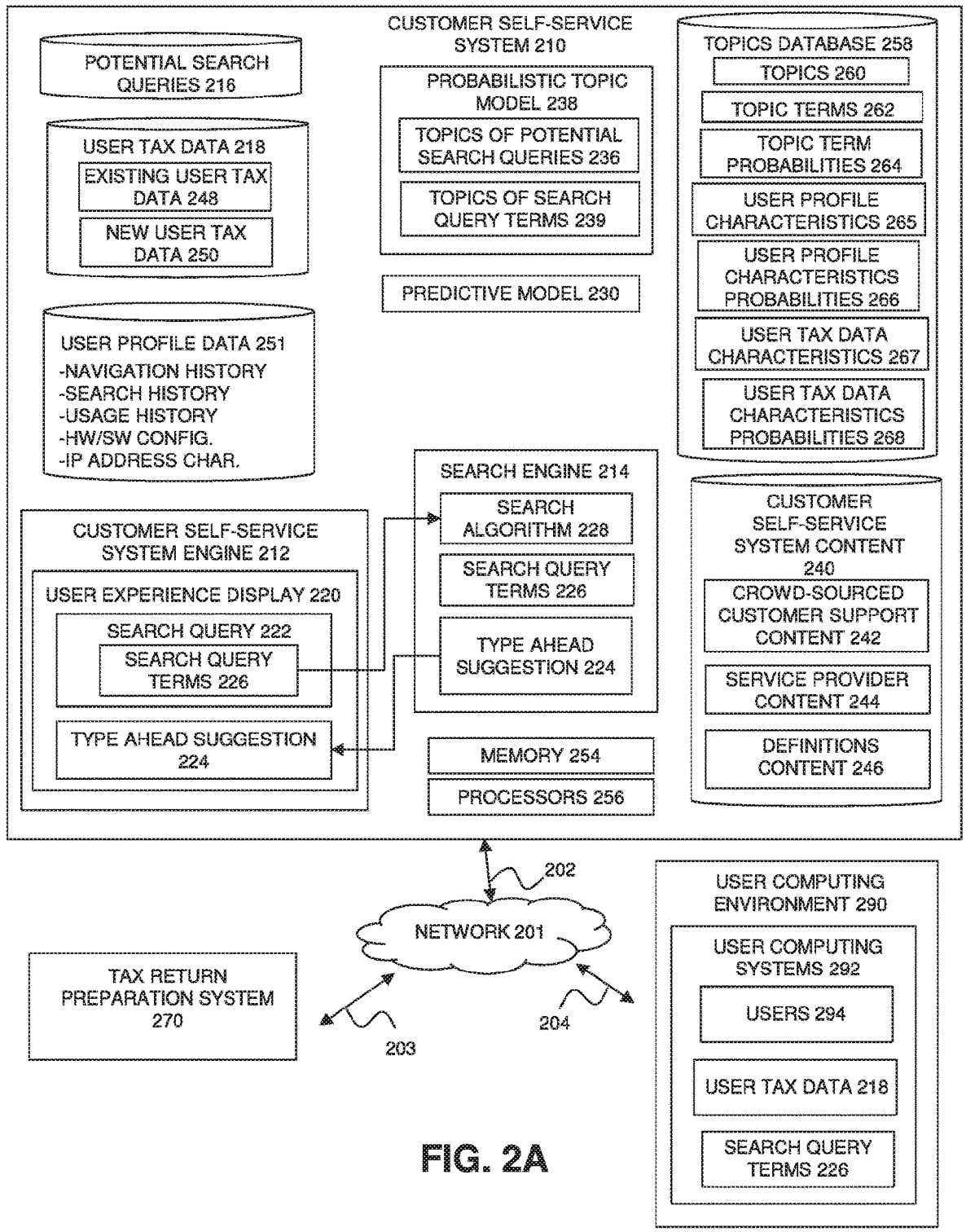
FIGS. 2A and 2B are block diagrams of an architecture for providing domain-specific and dynamic type ahead suggestions for search query terms with a customer self-service system for a tax return preparation system, in accordance with one embodiment.
Figure 2B:
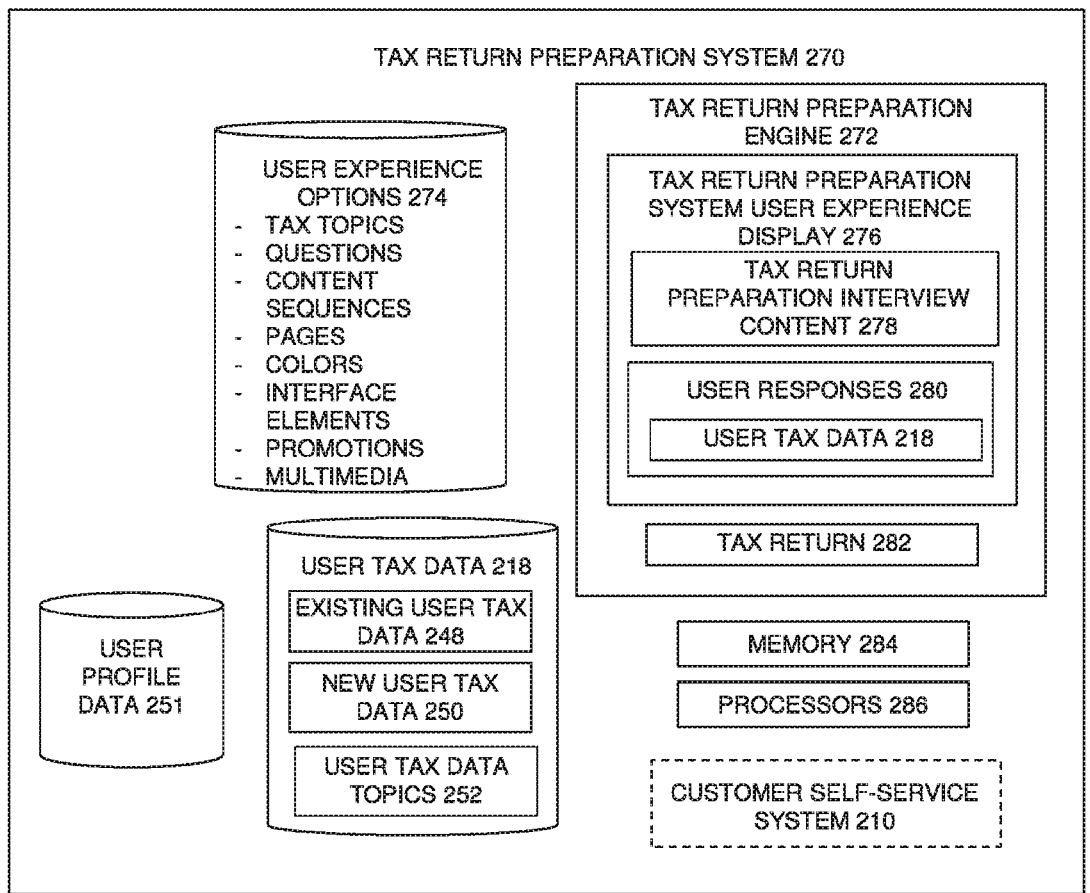
Figure 2B:
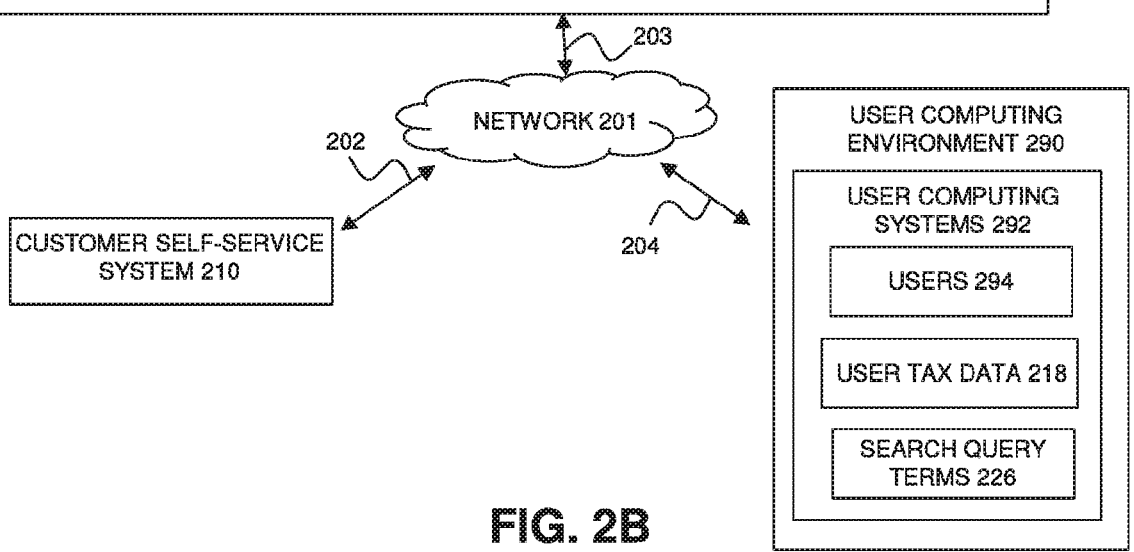

FIGS. 2A and 2B illustrate an example block diagram of a production environment 200 for providing domain-specific and dynamic type ahead suggestions for search query terms with a customer self-service system for a tax return preparation system, according to one embodiment. The production environment 200 includes a customer self-service system 210, a tax return preparation system 270, and a user computing environment 290 that are communicatively coupled through a network 201, according to one embodiment. The customer self-service system 210 is hosted in a computing environment, according to one embodiment. The tax return preparation system 270 is hosted in a computing environment, according to one embodiment. The customer self-service system 210 and the tax return preparation system 270 are hosted in the same computing environment, according to one embodiment. The customer self-service system 210, the tax return preparation system 270, and the user computing environment 290 are communicatively coupled to each other through the network 201 through one or more communications channels 202, 203, and 204, according to one embodiment.

The customer self-service system 210 includes a customer self-service system engine 212, a search engine 214, potential search queries 216, user tax data 218, and user profile data 251, for providing domain-specific type ahead suggestions for search query terms received by the customer self-service system 210 for the tax return preparation system 270, according to one embodiment. The customer self-service system engine 212 receives one or more complete or partial search query terms from users of the customer self-service system 210, and provides type ahead suggestions to the users in response to receipt of the search query terms, according to one embodiment. The customer self-service system 210 uses the search engine 214 to search for the type ahead suggestion based on the search query terms, the user tax data 218, and/or the user profile data 251, according to one embodiment. The search engine 214 populates the type ahead suggestion from the potential search queries 216, based on the search query terms and/or the user tax data 218 and/or the user profile data 251, according to one embodiment.

The customer self-service system engine 212 and/or the customer self-service system 210 provides a user experience display 220 to receive a search query 222 from a user and for providing a type ahead suggestion 224 to the user, according to one embodiment. The user experience display 220 includes, but is not limited to, textboxes, menus, buttons, avatars, audio/video content, and/or other user experience elements to receive the search query 222 and to provide the type ahead suggestion 224, according to one embodiment. The user experience display 220 includes a search text box in which the user formulates the search query 222 with one or more search query terms 226, and in which the user receives the type ahead suggestion 224 in a manner that is visually easy to detect, at least in part because it is adjacent to the characters the user is entering into the search text box, according to one embodiment.

The customer self-service system 210 uses the search engine 214 to search for the type ahead suggestion 224 based on the search query terms 226, the user tax data 218, and/or the user profile data 251, according to one embodiment. The potential search queries 216 represent search queries that have been formulated and/or submitted to the customer self-service system 210 and/or to the tax return preparation system 270 by a current user and/or by one or more prior users of the customer self-service system 210 and/or of the tax return preparation system 270, according to one embodiment.

The potential search queries 216 are stored in one or more tables, databases, or other data structures, to store records of previously received or defined search queries, according to one embodiment. In one embodiment, the customer self-service system 210 populates the potential search queries 216 based on customer self-service system content that is provided to users to answer or more user's questions, according one embodiment. In one embodiment, the customer self-service system 210 populates the potential search queries 216 based on customer self-service system content, the user tax data 218, and/or the user profile data 251, according one embodiment. In one embodiment, each of the potential search queries 216 is considered a topic, and each of the potential search queries 216 is associated with one or more topic terms, one or more topic term probabilities, user profile characteristics, and user tax data characteristics. The search engine 214 identifies potential search queries 216 that include the same topic or topics as one or more received search query terms 226, and provides (to the user) the more relevant one of the potential search queries 216, as a type ahead suggestion 224, according to one embodiment.

The search engine 214 and/or the customer self-service system 210 uses the user tax data 218 to generate the type ahead suggestion 224, according to one embodiment. The user tax data 218 is stored in one or more tables, databases, or other data structures, and includes existing user tax data 248 and/or new user tax data 250, according to one embodiment. The existing user tax data 248 represents user tax data acquired from prior users during the preparation of one or more prior tax returns (e.g., in the same year or in one or more prior years), according to one embodiment. The new user tax data 250 represents user tax data acquired from or about a present user (e.g., the submitter of the search query terms or the user of the account for which a tax return is being prepared) during the preparation of an unsubmitted tax return, according to one embodiment. The user tax data 218 includes any user information or tax information that has been used, that can be used, or that may be used at a future date to prepare a user's tax return, according to one embodiment. Examples of the user tax data 218 include, but are not limited to, a user's name, a date of birth, an address, a zip code, a home ownership status, a marital status, an annual income, a job title, an employer's address, spousal information, children's information, asset information, medical history, occupation, information regarding dependents, salary and wages, interest income, dividend income, business income, farm income, capital gain income, pension income, individual retirement account ("IRA") distributions, unemployment compensation, education expenses, health savings account deductions, moving expenses, IRA deductions, student loan interest deductions, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, residential energy credits, and any other information that is currently used, that can be used, or that may be used in the future to prepare a tax return for a user, according to one embodiment.

The customer self-service system 210 receives the user tax data 218 from the tax return preparation system 270, according to one embodiment. The customer self-service system 210 is optionally integrated into the tax return preparation system 270 and uses data retrieval commands or calls to retrieve at least part of the user tax data 218 for use in determining the type ahead suggestion 224, according to one embodiment. The content of the user tax data 218 and/or the values of the user tax data 218 are user tax data characteristics, according to one embodiment.

In one embodiment, the search engine 214 and/or the search algorithm uses the user profile data 251, in combination with the user tax data 218, to determine which of the potential search queries 216 to provide as the type ahead suggestion 224. The user profile data 251 include records of actions (e.g., user experience pages visited) that the customer self-service system can use to determine the user's search intent when providing the type ahead suggestion 224, according to one embodiment.

The user profile data 251 includes, but is not limited to, the user's navigation or browsing history within the tax return preparation system 270, the user's search history within the tax return preparation system 270, the user's navigation (e.g., interview screen visitation history), browsing, and/or search history within the customer self-service system 210, clickstream data for the user, estimated education level of the user, user-experience with the tax return preparation system 270 (e.g., a repeat versus first-time user), Internet Protocol ("IP") address characteristics (e.g., library, corporation, residential, foreign IP address, etc.), and hardware and/or software configurations of the user's computing device (e.g., Mac, PC, mobile device, operating system, etc.), according to one embodiment.

The search engine 214 and/or the customer self-service system 210 include a search algorithm 228 that is used to define the type ahead suggestion 224, according to one embodiment. The search engine 214 receives the search query terms 226 from the customer self-service system engine 212 and applies the search query terms 226 to the search algorithm 228 to generate/define the type ahead suggestion 224, according to one embodiment. The search engine 214 uses the search algorithm 228 to search the potential search queries 216 to determine which one of the potential search queries 216 is likely to be relevant to the user, in the context of the search query terms 226, the user tax data 218, and the user profile data 251, according to one embodiment. In one embodiment, the search algorithm 228 includes probabilistic topics model, query clustering, query de-duplication, Latent Dirichlet allocation algorithm, one or more predictive models, and/or one or more other database or content searching algorithms for matching the search query terms 226 to relevant ones of the potential search queries 216, according to one embodiment.

The search algorithm 228 includes or uses a probabilistic topic model 238 to identify topics for the search query terms 226 and for the potential search queries 216, according to one embodiment. The probabilistic topic model 238 receives the potential search queries 216 and/or the search query terms 226 and generates the topics of potential search queries 236 and/or the topics of search query terms 239, according to one embodiment. The probabilistic topic model 238 utilizes the Latent Dirichlet allocation algorithm to identify the topics of potential search queries 236 and/or the topics of search query terms 239, according to one embodiment. The search engine 214 uses the topics of potential search queries 236 and/or the topics of search query terms 239 to match relevant ones of the potential search queries 216 with the search query terms 226, according to one embodiment. The search engine 214 selects a highly relevant and/or a most relevant one of the potential search queries 216 as the type ahead suggestion 224, according to one embodiment.

The probabilistic topic model 238 (e.g., utilizing the Latent Dirichlet allocation algorithm) populates and uses the topics database 258 to determine relevance between the search query terms 226 and the potential search queries 216, according to one embodiment. The topics database 258 includes topics 260, topic terms 262, the topic term probabilities 264, user profile characteristics 265, user profile characteristics probabilities 266, user tax data characteristics 267, and user tax data characteristics probabilities 268, according to one embodiment.

The topics 260 represent themes, subjects, and/or categories of information that are included in the potential search queries 216, the user tax data 218, the user profile data 251, and/or customer self-service system content 240, according to one embodiment. The topics 260 are identified by applying the potential search queries 216, the user tax data 218, the user profile data 251, and/or customer self-service system content 240 to the probabilistic topic model 238, according to one embodiment. As a result, the topics 260 represent themes, subjects, and/or categories of: information stored in the potential search queries 216, the user tax data 218, the user profile data 251, and/or customer self-service system content 240, according to one embodiment.

Examples of the topics 260 include, but are not limited to, W-2, 1099, dividends, interest from loans, taxes exempt dividends, stocks, mutual funds, bonds, capital loss, capital gains, retirement plans, security, rentals, state and local tax refunds, business income, schedule K-1, farm income, business taxes, business expenses and credit, sale of business property, gambling winnings, alimony received, jury duty, child's income, sale of home, property taxes, mortgage insurance, home energy credits, mortgage interest credit, home buyer credit, earned income credit, child and dependent care, adoption credit, child tax credit, donations to charity, car registration fees, personal property taxes, education expenses, student loan interest, medical expenses, other income taxes, sales tax, foreign taxes, individual retirement account contributions, job-related expenses, and the like, according to one embodiment.

Figure 3:
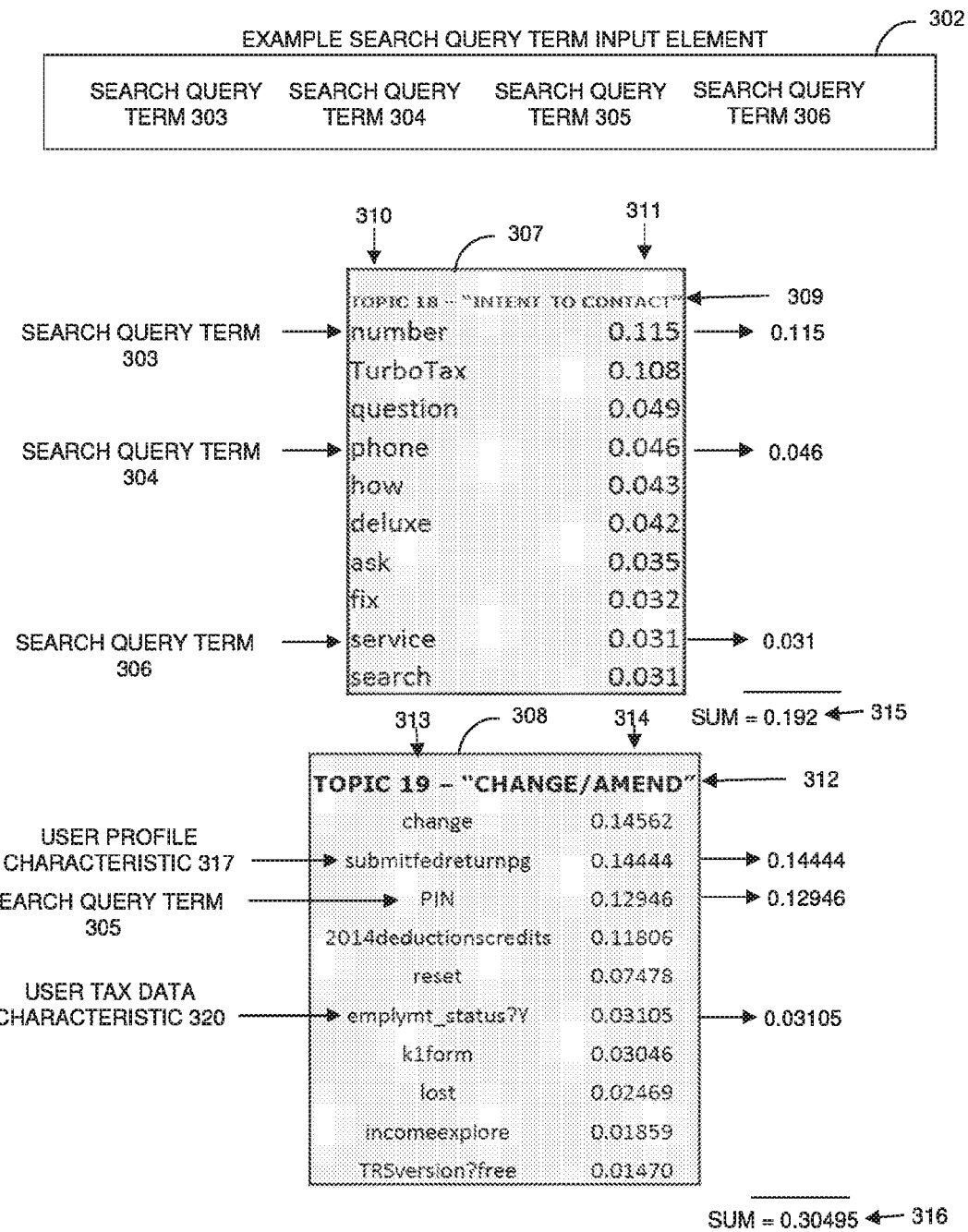
FIG. 3 is a diagram that illustrates one example of a technique for determining a relevant topic for one or more search query terms received from a user, in accordance with one embodiment.

In one embodiment, the topics 260 are the potential search queries 216 and include multiple terms. In one embodiment, the topics 260 include a single term. In one embodiment, the topics 260 include one or two terms but are shorter than a full search query. The topic terms 262 represent words that are likely to appear in the topics 260, according to one embodiment. The topic terms 262 have topic term probabilities 264 of occurring in the topics 260, according one embodiment. In other words, each of the topic terms 262 has a topic term probability 264 that defines the probability of a topic term occurring in a topic, according one embodiment. Although each of the topic terms 262 may probabilistically occur in more than one of the topics 260, the topic term probabilities 264 for reoccurring topic terms 262 will likely be different for different topics 260, according to one embodiment. An illustrative example of topics 260, topic terms 262, and topic term probabilities 264 are illustrated in FIG. 3 and are discussed below in relation to diagram 300, according to one embodiment.

The user profile characteristics probabilities 266 and/or the user tax data characteristics probabilities 268 quantify the likelihood that a user will have question about a topic when one or more of the user profile characteristics and/or user tax data characteristics exist, according to one embodiment. The user profile characteristics 265 (e.g., whether the user has performed a particular action) are associated with the user profile characteristics probabilities 266, and the user tax data characteristics 267 (e.g., whether the user qualifies for or has entered a particular tax-related parameter) are associated with the user tax data characteristics probabilities 268, according to one embodiment. The user profile characteristics probabilities 266 represent a likelihood or a probabilistic relationship between a topic and user profile characteristics, and can be used by the probabilistic topic model 238 to add context and certainty to the identification of a particular topic (e.g., a potential search query) as being relevant to the search query terms 226 and/or to the user, according to one embodiment. The user tax data characteristics probabilities 268 represent a likelihood or a probabilistic relationship between a topic and user tax data characteristics, and can be used by the probabilistic topic model 238 to add context and certainty to the identification of a particular topic as being relevant to the search query terms 226 and/or to the user, according to one embodiment.

In one embodiment, the predictive model 230 and/or the probabilistic topic model 238 generates the user profile characteristics probabilities 266 and/or the user tax data characteristics probabilities 268 by applying one or more analytics algorithms (e.g., regression, neural networks, Latent Dirichlet allocation, and/or any know or later developed by those skilled in the art) to the user tax data 218 that is representative of prior users and to the user profile data 251 that is representative of prior users, to determine a likelihood or probability of a particular context characteristic occurring with, promoting, or inducing a question or search query terms for a particular topic, according to one embodiment.

The search engine 214 and/or the customer self-service system 210 uses the topic term probabilities 264, the user profile characteristics probabilities 266, and/or the user tax data characteristics probabilities 268 to disambiguate search query terms that can have multiple meanings and/or that can be interpreted in different ways, according to one embodiment. An intended use of a word or an acronym can be clarified by considering types of income, deductions, dependencies, or other user tax data characteristics when interpreting the word or acronym entered as one of the search query terms 226, according to one embodiment. An intended use of the word or an acronym can be clarified by considering which user experience pages a user has visited, how many times a user has used the tax return preparation system 270, and other user profile characteristics, according to one embodiment. As an illustrative example, if a user types in search query terms that include "VA", the search engine 214 has to determine whether the user intends "VA" to mean Virginia or to mean Veterans Affairs. If, however, the search engine 214 analyzes the user tax data 218 to identify Veterans Disability Pension and/or the search engine 214 analyzes the user profile data 251 to see that the user has navigated to a user experience page related to Veterans' Benefits, then the search engine 214 can increase the likelihood that the acronym "VA" is intended to mean Veterans Affairs and decrease the likelihood that the acronym "VA" is intended to mean Virginia, according to one embodiment.

The search algorithm 228 includes or uses a predictive model 230 for determining a likelihood of potential search queries 216 being relevant to the received search query terms 226 within the context of a particular set of the user tax data 218 and within the context of particular set of user profile data 251, according to one embodiment. The predictive model 230 generates likelihoods of potential search queries 216, from which the customer self-service system 210 and/or the search engine 214 can distinguish more-likely from less-likely ones of the potential search queries 216, according to one embodiment. The predictive model 230 uses the user tax data 218 and/or the user profile data 251 in determining the likelihoods of relevance of the potential search queries 216 to the search query terms 226, according to one embodiment. In one embodiment, the search engine 214 uses the predictive model 230 to determine the topic term probabilities 264, the user profile characteristics probabilities 266, and/or the user tax data characteristics probabilities 268, based on the interactions of prior users with the customer self-service system 210 and/or with the tax return preparation system 270, according to one embodiment.

The predictive model 230 is trained from existing searches performed by the search engine 214, from prior search queries submitted by users to the customer self-service system 210, with the user tax data 218, with the user profile data 251, and/or with the customer self-service system content 240, according to one embodiment. The predictive model 230 is trained using one or more predictive model training operations including, but not limited to, regression, logistic regression, decision trees, artificial neural networks, support vector machines, linear regression, nearest neighbor methods, distance based methods, naive Bayes, linear discriminant analysis, k-nearest neighbor algorithm, and/or any other know or later developed predictive model training operation, according to one embodiment.

The customer self-service system content 240 includes a variety of data representing content that can be provided to the users to answer users' questions, in response to the users' search query 222, according to one embodiment. The customer self-service system content 240 includes crowd-sourced customer support content 242, service provider content 244, and definitions content 246, according to one embodiment. The crowd-sourced customer support content 242 includes questions and responses that are submitted by a community of question askers and response providers that use the customer self-service system 210 or another question and answer customer support system that is associated with the tax return preparation system 270, according to one embodiment. The crowd-sourced customer support content 242 can also be referred to as user generated content ("UGC") to distinguish the crowd-sourced customer support content 242 from the service provider content 244, according to one embodiment. The service provider content 244 includes white papers, questions, answers, frequently asked questions, answers to frequently asked questions, tutorials, audio/video content, interactive content, or other content that can be used to assist users in learning about taxes, tax preparation, the tax return preparation system 270, or other relevant subject matter, according to one embodiment. The definitions content 246 include acronym definitions, definitions of tax-specific terms (e.g., tax jargon), and/or definitions of terms that are related to tax law, preparing tax returns, and the tax return preparation system 270, according to one embodiment.

The customer self-service system 210 determines which portions of the customer self-service system content 240 to provide to the user, based on the search query terms 226 and/or based on the type ahead suggestion 224 that is selected by the user, according to one embodiment. Because the potential search queries 216 change based on additions, deletions, or other modifications to the search query terms 226, the customer self-service system 210 dynamically updates the type ahead suggestion 224 that is displayed, as the user adds, deletes, and/or modifies the search query terms 226 within the user experience display 220, according to one embodiment.

The customer self-service system 210 is partially or wholly stored in memory 254 (inclusive of non-volatile memory and volatile memory) and is partially or wholly executed by processors 256, according to one embodiment.

The user computing environment 290 is representative of one or more user computing systems 292 that may be used by one or more users 294 to provide the user tax data 218 to the tax return preparation system 270, according to one embodiment. The user computing environment 290 may be used to provide search query terms 226 to the customer self-service system 210 (directly or indirectly through the tax return preparation system 270), and may be used to receive the type ahead suggestion 224 from the customer self-service system 210 (directly or indirectly through the tax return preparation system 270), according to one embodiment.

FIG. 2B illustrates additional features of the tax return preparation system 270 within the production environment 200, according to one embodiment. The tax return preparation system 270 includes a tax return preparation engine 272, user experience options 274, and the user tax data 218 for progressing users through tax return preparation interviews to prepare tax returns for tax filers, according to one embodiment. The tax return preparation engine 272 provides the tax return preparation system user experience display 276, by which the tax return preparation engine 272 progresses users through tax return preparation interviews by providing users with tax return preparation interview content 278, according to one embodiment. The tax return preparation engine 272 populates the tax return preparation interview content 278 with selected portions of the user experience options 274, according to one embodiment.

The tax return preparation engine 272 populates the tax return preparation interview content 278 with one or more of a variety of the user experience options 274, including, but not limited to, tax topics, questions, content sequences, pages, colors, interface elements, promotions, multimedia, and the like, to provide each user with a personalized tax return preparation interview, according to one embodiment. The tax return preparation system user experience display 276 incorporates portions of the user experience display 220 (of the customer self-service system 210) to enable the customer self-service system 210 to acquire information from users of the tax return preparation system 270, according to one embodiment.

The tax return preparation engine 272 uses the tax return preparation system user experience display 276 to both provide the tax return preparation interview content 278 and to receive user responses 280, according to one embodiment. The user responses 280 include user tax data 218 (e.g., new user tax data 250), according to one embodiment. The user tax data 218 includes financial and personal information that may be used to populate one or more tax-related forms, to facilitate preparing a tax filers tax return, according to one embodiment.

The tax return preparation engine 272 and/or the tax return preparation system 270 uses the user responses 280 (e.g., the user tax data 218) to prepare a tax return 282 represented by tax return data, for a tax filer, according to one embodiment. The tax return preparation system 270 is configured to file a tax return 282 with one or more state and/or federal government agencies, according to one embodiment. The tax return 282 includes one or more state and/or a federal tax returns, according to one embodiment.

The tax return preparation system 270 is data that is partially or wholly stored in memory 284 (inclusive of non-volatile memory and volatile memory) and is partially or wholly executed by processors 286, according to one embodiment.

All or part of the customer self-service system 210 is optionally integrated within the tax return preparation system 270 to facilitate the retrieval and sharing of the user tax data 218 and/or the user profile data 251, according to one embodiment. The customer self-service system 210 shares some computing environment resources (e.g., memory, processors, computer cabinets, networking equipment, etc.) with the tax return preparation system 270 but is a system that can be implemented on computing environment resources that are independent of the tax return preparation system 270 and/or are in a different computing environment, according to one embodiment. In one embodiment, portions of the customer self-service system 210 are integrated into the tax return preparation system 270, while the remainder of the customer self-service system 210 operates independent of the tax return preparation system 270. In one embodiment, the tax return preparation system 270 hosts the user experience display 220 (of the customer self-service system 210) while the functionality of the customer self-service system 210 that determines the type ahead suggestion 224 operates on computing environment resources that are independent of the computing environment resources of the tax return preparation system 270, according to one embodiment.

Although the features and functionality of the production environment 200 are illustrated and/or described in terms of individual and/or modularized components, engines, modules, models, databases/data stores, and/or systems, one or more of the functions of one or more of the components, engines, modules, models, databases/data stores, and/or systems are functionally combinable with one or more other described and/or illustrated components, engines, modules, models, databases/data stores, and/or systems, according to one embodiment.

FIG. 3 illustrates a diagram 300 that shows one technique for determining a relevant topic for search query terms received from a user by including user profile characteristics and user profile characteristics, according to one embodiment. The diagram 300 includes a search query term input element 302, e.g., a text box, for receiving search query terms (or a question comprising search query terms) from a user, according to one embodiment. The search query term input element 302 is an example of a search query term input element, and other embodiments of search query term input elements (e.g., user interface elements) can be used. The search query term input element 302 includes search query terms entered into the search query term input element 302, according to one embodiment. The example search query terms include a search query term 303, search query term 304, search query term 305, and search query term 306, according to one embodiment.

Although four example search query terms are illustrated, many more search query terms or fewer search query terms can also be received and analyzed with the customer support system to identify a relevant topic for search query terms, according to one embodiment.

The diagram 300 includes two example entries for the topics database 258 (shown in FIG. 2A) that can be used to determine a topic that is relevant to the search query terms 303, 304, 305, 306, according to one embodiment. The diagram 300 includes a topics database entry 307 and a topics database entry 308, to illustrate an example process of determining a relevant, a more relevant, a highest relevant, or multiple relevant topics for the search query terms 303, 304, 305, 306, according to one embodiment. The topics database entry 307 includes a topic 309, topic terms 310, and topic term probabilities 311, according to one embodiment. The topics database entry 308 includes a topic 312, topic terms combined with context characteristics 313, and topic term probabilities combined with context characteristics probabilities 314, according to one embodiment. The topics database entries 307 and 308 are examples of entries that are made to the topics database 258 (shown in FIG. 2A), according to one embodiment. The topics 309 and 312 are examples of the topics 260 in the topics database 258, according to one embodiment. The topic terms 310 are examples of topic terms 262 entered into the topics database 258, according to one embodiment. The topic term probabilities 311 are examples of the topic term probabilities 264 entered into the topics database 258, according to one embodiment.

Referring to FIGS. 2A and 3, the topic terms combined with context characteristics 313 are examples of topic terms 262, user profile characteristics 265 and user tax data characteristics 267 entered into the topics database 258, according to one embodiment. The topic term probabilities combined with the context characteristics probabilities 314 are examples of the topic term probabilities 264, the user profile characteristics probabilities 266, and user tax data characteristics probabilities 268 entered into the topics database 258, according to one embodiment. The topics 309 and 312 include a numerical identifier (e.g., topic "18" and topic "1") and an alphabetical identifier (e.g., "intent to contact" topic and "deductions" topic), according to one embodiment.

The topics database entry 308 includes context characteristics of "submitfedreturnpg", "2014deductionscredits", "emplymt_status?Y", "k1 form", "incomeexplore", and "TRSversion?free", which represent examples of user profile characteristics and user tax data characteristics that may be stored in the topics database 258, according to one embodiment. User profile characteristics and user tax data characteristics are examples of context characteristics. For these example context characteristics, "submitfedreturnpg" represents an example of a user experience display identifier for a user experience display page for submitting a federal tax return, "2014deductionscredits" represents an example of a user experience display identifier for a user experience display page for answering questions about deductions and credits for 2014 taxes, "emplymt_status?Y" represents a user characteristic for whether the user is employed, "k1 form" represents an example of a user experience display identifier for a user experience display page for filling out a K1 tax form, "incomeexplore" represents an example of a user experience display identifier for a user experience display page for determining income for a user in a tax return preparation system, and "TRSversion?free" represents an identifier of a free version of a tax return preparation system, according to one embodiment.

The customer self-service system 210 determines a topic relevance score 315 for the topic 309 and a topic relevance score 316 for the topic 312 by combining or adding the topic term probabilities and context characteristics probabilities that are associated with one or more of the search query terms 303, 304, 305, 306, the user tax data characteristics, and the user profile characteristics. The customer self-service system 210 receives the search query terms 303, 304, 305, 306 from the user in the search query term input element 302, according one embodiment. The customer self-service system 210 searches the topics database entries 307 and 308 for topic terms that match the search query terms 303, 304, 305, 306 and for context characteristics that exist during the submission of the search query terms 303, 304, 305, 306, according one embodiment.

The customer self-service system 210 then associates the topic term probabilities 311, 314 of the topic terms 310, 313 that match the search query terms 303, 304, 305, 306 and search context, to associate the relevant topic term probabilities 311, 314, to the search query terms 303, 304, 305, 306, according one embodiment. For each topic 309 and 312, the customer self-service system 210 determines the topic relevance scores 315, 316, by combining the topic term probabilities 311, 314 that are relevant to and associated with the search query terms 303, 304, 305, 306, user tax data characteristics, and user profile characteristics that exist in the topics 309, 312.

As a specific and illustrative example, if the search query term 303 is the topic term "number", the search query term 304 is the topic term "phone", the search query term 305 is the topic term "PIN", the search query term 306 is the search query term "service", the user profile characteristic 317 includes "submitfedreturnpg", and the user tax data characteristic 320 includes "emplymt_status?Y", then the topic relevance score 315 for the topic 309 is 0.192, and the topic relevance score 316 for the topic 312 is 0.12946, without taking context characteristics into account. If context characteristics are factored into the topic relevance score 316 for the topic 312, then the topic relevance score 316 for the topic 312 increases to 0.30295. Accordingly, the topic relevance score 316 for the topic 312 makes the topic 312—"change/amend" more relevant to the search query terms 303, 304, 305, 306 than the topic 309—"intentto contact", because the topic relevance score 316 is greater than the topic relevance score 315, according to one example of an embodiment.

The customer self-service system 210 determines more relevant, most relevant, or highest relevant topics for the search terms by ranking, sorting, and/or comparing the topic relevance scores 315, 316 for each of the topics 309, 312, according to one embodiment. The customer self-service system 210 determines that the topic with the highest topic relevance score is the highest relevant topic to the search query terms 303, 304, 305, 306, according one embodiment.

Process

Figure 4:
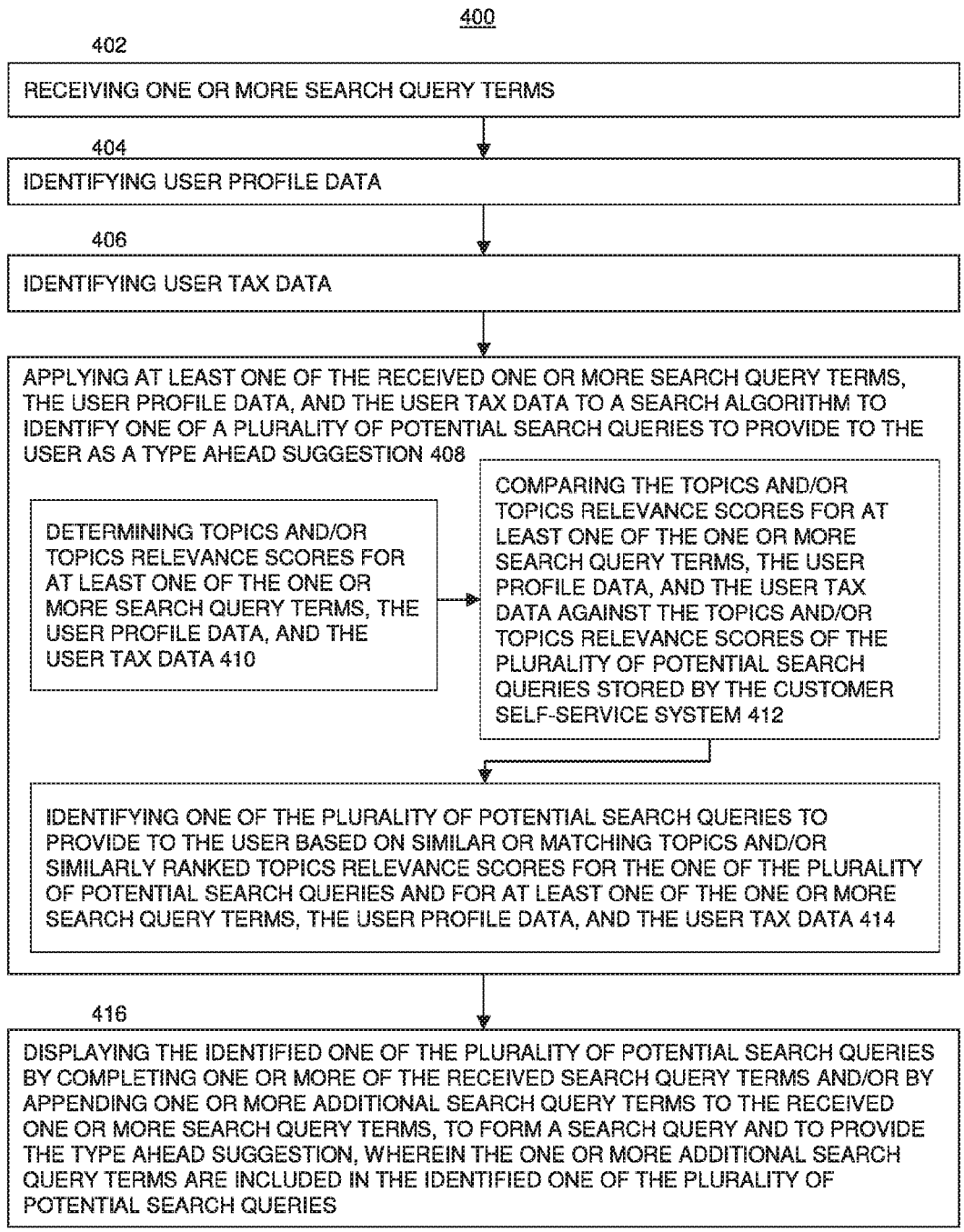
FIG. 4 is a flow diagram of a process for providing domain-specific and dynamic type ahead suggestions for search query terms with a customer self-service system for a tax return preparation system, in accordance with one embodiment.

FIG. 4 is an example flow diagram of a process 400 for providing domain-specific and dynamic type ahead suggestions for search query terms with a customer self-service system for a tax return preparation system, according to one embodiment. The process 400 includes operations that may be used by the production environment 200 (shown in FIGS. 2A and 2B) to generate a user experience/user experience page similar to the one illustrated in FIG. 1, according to one embodiment.

At operation 402, the process includes receiving one or more search query terms, according to one embodiment. Operation 402 proceeds to operation 404, according to one embodiment.

At operation 404, the process includes identifying user profile data, according to one embodiment. Identifying user profile data includes receiving the user profile data from a tax return preparation system, by a customer self-service system, according to one embodiment. Operation 404 proceeds to operation 406, according to one embodiment.

At operation 406, the process includes identifying user tax data, according to one embodiment. Identifying user tax data includes receiving the user tax data from a tax return preparation system, by a customer self-service system, according to one embodiment.

At operation 408, the process includes applying at least one of the received one or more search query terms, the user profile data, and the user tax data to a search algorithm to identify one of a plurality of potential search queries to provide to the user as a type ahead suggestion, according to one embodiment. Operation 408 includes operations 410, 412, and/or 414, according to one embodiment.

At operation 410, the process includes determining topics and/or topics relevance scores for at least one of the one or more search query terms, the user profile data, and the user tax data, according to one embodiment. Operation 410 proceeds to operation 412, according to one embodiment.

At operation 412, the process includes comparing the topics and/or topics relevance scores for at least one of the one or more search query terms, the user profile data, and the user tax data against the topics and/or topics relevance scores of the plurality of potential search queries stored by the customer self-service system, according to one embodiment. Operation 412 proceeds to operation 414, according to one embodiment.

At operation 414, the process includes identifying one of the plurality of potential search queries to provide to the user based on similar or matching topics and/or similarly ranked topics relevance scores for the one of the plurality of potential search queries and for at least one of the one or more search query terms, the user profile data, and the user tax data, according to one embodiment. Operation 414 proceeds to operation 416, according to one embodiment.

At operation 416, the process includes displaying the identified one of the plurality of potential search queries by completing one or more of the received search query terms and/or by appending one or more additional search query terms to the received one or more search query terms, to form a search query and to provide the type ahead suggestion, wherein the one or more additional search query terms are included in the identified one of the plurality of potential search queries, according to one embodiment.

Figure 5A:
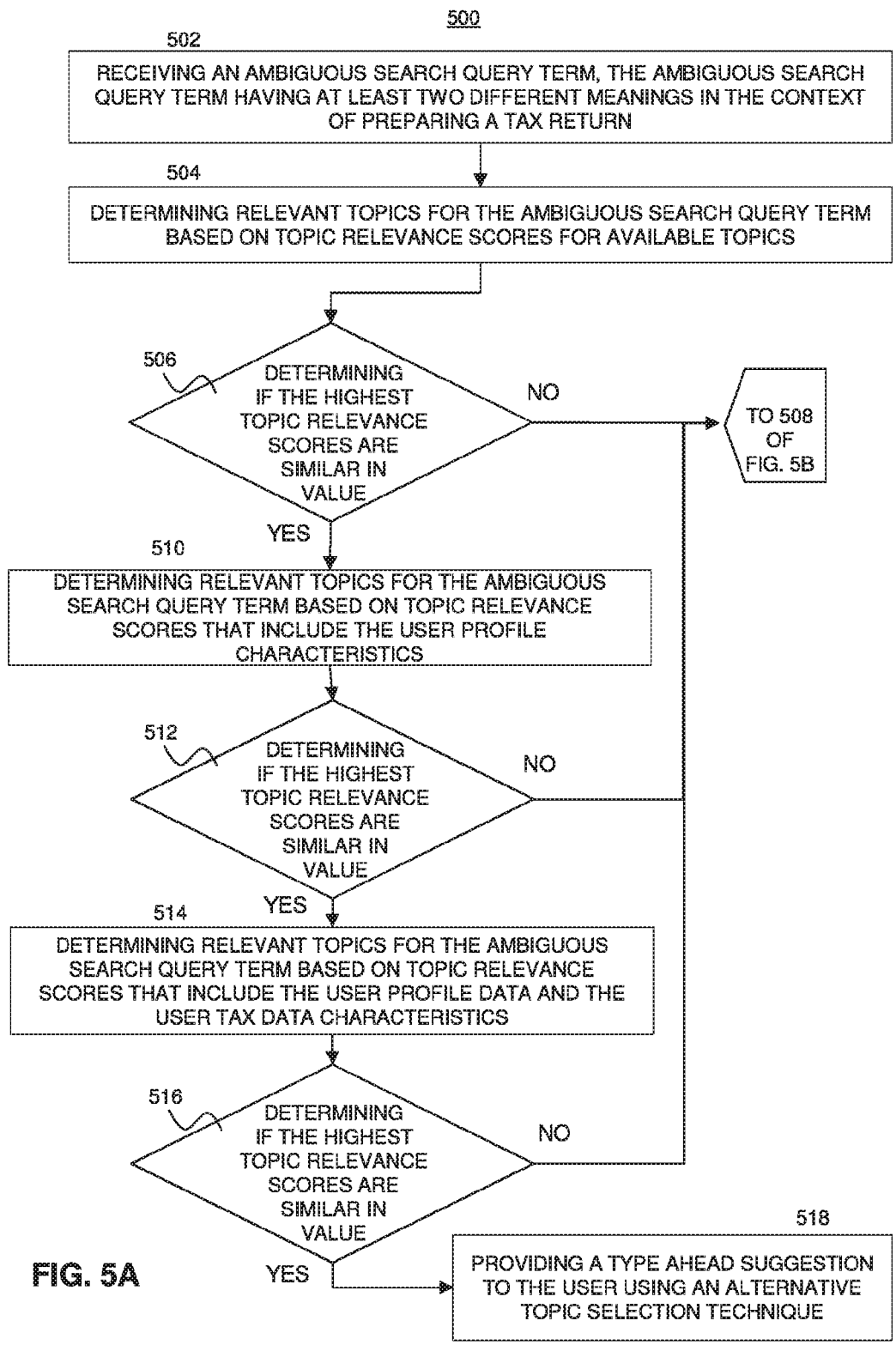
FIGS. 5A and 5B are a flow diagram of a process for disambiguating a search query term, in accordance with one embodiment.
Figure 5B:
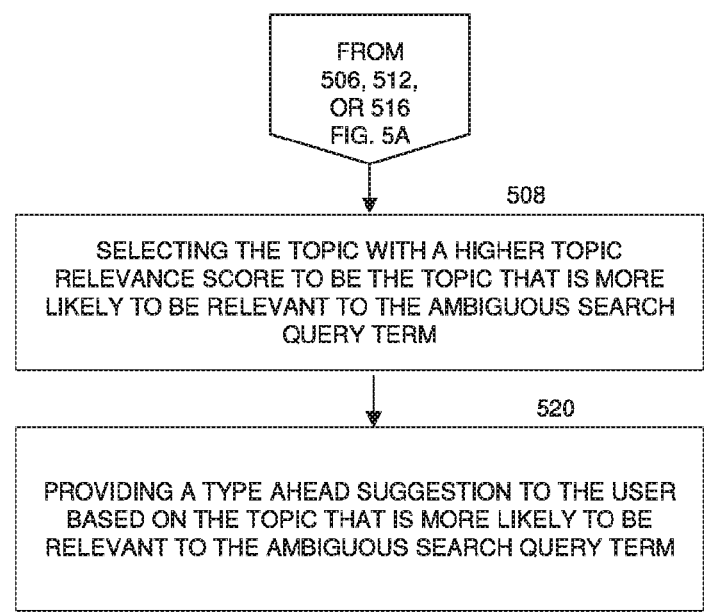

FIGS. 5A and 5B are an example flow diagram of a process 500 for disambiguating a search query term, according to one embodiment. The process 500 uses the user profile characteristics and/or the user tax data characteristics to disambiguate one or more potentially ambiguous (e.g., can be interpreted to have more than one meaning) search query terms, according to one embodiment.

At operation 502, the process includes receiving an ambiguous search query term, the ambiguous search query term having at least two different meanings in the context of preparing a tax return, according to one embodiment. Operation 502 proceeds to operation 504, according to one embodiment.

At operation 504, the process includes determining relevant topics for the ambiguous search query term based on topic relevance scores for available topics, according to one embodiment. Operation 504 proceeds to operation 506, according to one embodiment.

At operation 506, the process includes determining if the highest topic relevance scores are similar in value, according to one embodiment. The highest topic relevance scores are similar to value, if the topic relevance scores have a difference that is less than a predetermined threshold (e.g., 0.1, 1, 10, etc.), according to one embodiment. The predetermined value can depend on the numbering system or scheme used for the topic relevance scores, according to one embodiment. If two or more highest topic relevance scores are not similar in value, operation 506 proceeds to operation 508 (of FIG. 5B), according to one embodiment. If two or more of the highest topic relevance scores are similar in value, operation 506 proceeds to operation 510, according to one embodiment.

At operation 510, the process includes determining relevant topics for the ambiguous search query term based on topic relevance scores that include the user profile characteristics, according to one embodiment. Operation 510 proceeds to operation 512, according to one embodiment.

At operation 512, the process includes determining if the highest topic relevance scores are similar in value, according to one embodiment. If two or more highest topic relevance scores are not similar in value, operation 512 proceeds to operation 508 (of FIG. 5B), according to one embodiment. If two or more of the highest topic relevance scores are similar in value, operation 512 proceeds to operation 514, according to one embodiment.

At operation 514, the process includes determining relevant topics for the ambiguous search query term based on topic relevance scores that include the user profile data and the user tax data characteristics, according to one embodiment. Operation 514 proceeds to operation 516, according to one embodiment.

At operation 516, the process includes determining if the highest topic relevance scores are similar in value, according to one embodiment. If two or more highest topic relevance scores are not similar in value, operation 516 proceeds to operation 508 (of FIG. 5B), according to one embodiment. If two or more of the highest topic relevance scores are similar in value, operation 506 proceeds to operation 518, according to one embodiment.

At operation 518, the process includes providing a type ahead suggestion to the user using an alternative topic selection technique, according to one embodiment. The alternative topic selection technique can include randomly choosing one of the topics or potential search queries that have similar values for the topic relevance scores, according to one embodiment.

At operation 508 (of FIG. 5B), the process includes selecting the topic with a higher topic relevance score to be the topic that is more likely to be relevant to the ambiguous search query term, according to one embodiment. Operation 508 proceeds to operation 520, according to one embodiment.

At operation 520, the process includes providing a type ahead suggestion to the user based on the topic that is more likely to be relevant to the ambiguous search query term, according to one embodiment. In one embodiment, the topic is one of the potential search queries, according to one embodiment.

As noted above, the specific illustrative examples discussed above are but illustrative examples of implementations of embodiments of the method or process for providing domain-specific and dynamic type ahead suggestions for search query terms with a customer self-service system for a tax return preparation system. Those of skill in the art will readily recognize that other implementations and embodiments are possible. Therefore, the discussion above should not be construed as a limitation on the claims provided below.

Providing domain-specific and dynamic type ahead suggestions for search query terms with a customer self-service system for a tax return preparation system is a technical solution to a long standing technical problem and is not an abstract idea for at least a couple of reasons. First, providing domain-specific and dynamic type ahead suggestions for search query terms with a customer self-service system for a tax return preparation system is not an abstract idea cannot be performed using pen and paper. Second, providing domain-specific and dynamic type ahead suggestions for search query terms with a customer self-service system for a tax return preparation system is not an abstract idea cannot be performed by a human mind because the quantity of data that would have to be mentally processed is believed to be nearly humanly impossible.

Providing domain-specific and dynamic type ahead suggestions for search query terms with a customer self-service system for a tax return preparation system is not an abstract idea allows for significant improvement to the fields of user experience, self-service systems, customer service, customer retention, electronic tax return preparation, and domain-specific search engines, according to one embodiment. The present disclosure adds significantly to the concept of content searching by providing domain-specific type ahead suggestions for search query terms with a customer self-service system for a tax return preparation system because the customer self-service system: increases the likelihood that a user will enter a question that is answerable (e.g., not enter a statement, explicative, or other non-question); increases trust of the user in the tax return preparation system; assists users in formulating a search query; reduces the amount of time users spend entering a search query into a search text box; and reduces potential confusion by an answer by disambiguating search query terms, according to one embodiment.

As a result, embodiments of the present disclosure allow for reduced use of processor cycles, memory, and power consumption, by reducing the time spent by users searching for answers among search results and by reducing time spent by users to repeatedly search for an answer to their question in computing environments, according to one embodiment. Consequently, computing and communication systems implementing and/or providing the embodiments of the present disclosure are transformed into more operationally efficient devices and systems.

In addition to improving overall computing performance, providing domain-specific and dynamic type ahead suggestions for search query terms with a customer self-service system for a tax return preparation system significantly improves the field of tax return preparation systems, by reducing the amount of time it takes to progress a user through a tax return preparation interview due to delays caused by users' feelings of fear, uncertainty, and/or doubt, according to one embodiment. Furthermore, by providing domain-specific and dynamic type ahead suggestions for search query terms with a customer self-service system for a tax return preparation system, the disclosed embodiments help maintain and/or build trust and therefore loyalty in the tax return preparation system with which the customer self-service system is associated, which results in repeat customers, efficient preparation of customers' tax returns, and reduced abandonment of use of the tax return preparation system, according to one embodiment.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media can include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

What is claimed is:

1. A method for providing domain-specific and dynamic type-ahead suggestions for search query terms, the method performed by one or more processors of a computing system associated with a customer self-service system and comprising:
    storing a plurality of potential search queries in a memory associated with the computing system, each of the plurality of potential search queries including one or more search terms;
    presenting user experience data and a search text box on a display screen viewable by a user;
    receiving, via the search text box presented on the display screen, one or more search query terms of a search query provided by the user;
    identifying a number of topics in each of the one or more search query terms provided by the user;
    determining one or more topic relevance scores for each of the potential search queries using a predictive topic model, each topic relevance score indicating a relevance of the corresponding potential search query to a respective one of the topics identified in the received search query terms;
    ranking the plurality of potential search queries based on their respective topic relevance scores;
    identifying which potential search query of the plurality of potential search queries has a highest topic relevance score; and
    presenting the identified potential search query as a type-ahead suggestion on the display screen adjacent to the one or more search query terms provided in the search text box, the presented type-ahead suggestion configured to assist the user by completing the search query.

2. The method of claim 1, further comprising:
    storing a user profile for each of a plurality of users associated with the customer self-service system;
    determining a level of relevance of each of the plurality of potential search queries to each user profile; and
    determining, for each of the plurality of potential search queries, a probability score for each user profile based on the determined relevance levels.

3. The method of claim 2, wherein the determination of the topic relevance scores is further based on the probability scores determined for the user's profile.

4. The method of claim 2, wherein the user profile includes one or more of a search history of a respective user, an income of the respective user, a zip code of the respective user, or tax exemptions of the respective user.

5. The method of claim 1, further comprising:
    training the predictive topic model using one of logistical regression, a decision tree, an artificial neural network, a support vector machine, a naive Bayes operation, a linear discriminant analysis, or a k-nearest neighbor algorithm.

6. The method of claim 1, wherein determining the topic relevance scores further comprises applying the one or more received search query terms to a Latent Dirichlet Allocation algorithm.

7. The method of claim 1, wherein the predictive topic model is configured to identify the topics in each of the one or more search query terms based at least in part on a number of topics associated with each of the plurality of potential search queries.

8. The method of claim 1, wherein the predictive topic model includes one or more of a Latent Dirichlet Allocation algorithm, a Latent Semantic Indexing ("LSI") algorithm, a query clustering algorithm, or a query de-duplication algorithm.

9. The method of claim 1, further comprising:
    receiving one or more additional search query terms from the user via the search text box; and
    dynamically updating the type-ahead suggestion presented on the display screen based on the one or more additional search query terms.

10. The method of claim 1, wherein the customer self-service system is associated with an electronic tax return preparation system, the method further comprising:
    determining a type of question associated with the one or more search query terms received from the user, the determined type of question comprising one or both of a tax related question or a product-related question.

11. A computing system configured to provide domain-specific and dynamic type-ahead suggestions for search query terms, the computing system comprising:
    one or more processors; and
    a memory coupled to the one or more processors and storing instructions that, when executed by the one or more processors, causes the computing system to perform operations comprising:
        storing a plurality of potential search queries in a memory associated with the computing system, each of the plurality of potential search queries including one or more search terms;
        presenting user experience data and a search text box on a display screen viewable by a user;
        receiving, via the search text box presented on the display screen, one or more search query terms of a search query provided by the user;
        identifying a number of topics in each of the one or more search query terms provided by the user;

determining one or more topic relevance scores for each of the potential search queries using a predictive topic model, each topic relevance score indicating a relevance of the corresponding potential search query to a respective one of the topics identified in the received search query terms;

ranking the plurality of potential search queries based on their respective topic relevance scores;

identifying which potential search query of the plurality of potential search queries has a highest topic relevance score; and presenting the identified potential search query as a type-ahead suggestion on the display screen adjacent to the one or more search query terms provided in the search text box, the presented type-ahead suggestion configured to assist the user by completing the search query.

12. The computing system of claim 11, wherein execution of the instructions causes the computing system to perform operations further comprising:

storing a user profile for each of a plurality of users associated with the customer self-service system;

determining a level of relevance of each of the plurality of potential search queries to each user profile; and determining, for each of the plurality of potential search queries, a probability score for each user profile based on the determined relevance levels.

13. The computing system of claim 12, wherein the determination of the topic relevance scores is further based on the probability scores determined for the user's profile.

14. The computing system of claim 12, wherein the user profile includes one or more of a search history of a respective user, an income of the respective user, a zip code of the respective user, or tax exemptions of the respective user.

15. The computing system of claim 11, wherein execution of the instructions causes the computing system to perform operations further comprising:

training the predictive topic model using one of logistical regression, a decision tree, an artificial neural network, a support vector machine, a naive Bayes operation, a linear discriminant analysis, or a k-nearest neighbor algorithm.

16. The computing system of claim 11, wherein determining the topic relevance scores further comprises applying the one or more received search query terms to a Latent Dirichlet Allocation algorithm.

17. The computing system of claim 11, wherein the predictive topic model is configured to identify the topics in each of the one or more search query terms based at least in part on a number of topics associated with each of the plurality of potential search queries.

18. The computing system of claim 11, wherein the predictive topic model includes one or more of a Latent Dirichlet Allocation algorithm, a Latent Semantic Indexing ("LSI") algorithm, a query clustering algorithm, or a query de-duplication algorithm.

19. The computing system of claim 11, wherein execution of the instructions causes the computing system to perform operations further comprising:

receiving one or more additional search query terms from the user via the search text box; and dynamically updating the type-ahead suggestion presented on the display screen based on the one or more additional search query terms.

20. The computing system of claim 11, wherein the customer self-service system is associated with an electronic tax return preparation system, and execution of the instructions causes the computing system to perform operations further comprising:

determining a type of question associated with the one or more search query terms received from the user, the determined type of question comprising one or both of a tax related question or a product-related question.

* * * * *